(12) United States Patent
Lin et al.

(10) Patent No.: US 12,414,111 B2
(45) Date of Patent: Sep. 9, 2025

(54) METHOD FOR WIRELESS COMMUNICATION, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Yanan Lin, Guangdong (CN); Jing Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 332 days.

(21) Appl. No.: 18/342,565

(22) Filed: Jun. 27, 2023

(65) Prior Publication Data

US 2023/0345476 A1   Oct. 26, 2023

Related U.S. Application Data

(63) Continuation of application No. PCT/CN2021/073411, filed on Jan. 22, 2021.

(51) Int. Cl.
*H04W 72/1268* (2023.01)
*H04L 1/00* (2006.01)
*H04W 72/566* (2023.01)

(52) U.S. Cl.
CPC ....... *H04W 72/1268* (2013.01); *H04L 1/0061* (2013.01); *H04W 72/566* (2023.01)

(58) Field of Classification Search
CPC ........... H04W 72/566; H04W 72/1268; H04W 72/02; H04W 72/21; H04L 1/0061; H04L 1/0072; H04L 5/0064; H04L 5/0053
See application file for complete search history.

(56) References Cited

U.S. PATENT DOCUMENTS 11,968,680 B2 *  4/2024  Noh ..................... H04L 5/0094
2019/0037586 A1  1/2019  Park et al.
(Continued)

FOREIGN PATENT DOCUMENTS

CN       110324130       10/2019
CN       111278143        6/2020
(Continued)

OTHER PUBLICATIONS

OPPO, "Enhancements on intra-UE multiplexing/prioritization," 3GPP TSG RAN WG1 #104-e, R1-2100184, Jan. 2021.
EPO, Extended European Search Report for EP Application No. 21920322.1, Dec. 11, 2023.
(Continued)

*Primary Examiner* — Syed Ali
(74) *Attorney, Agent, or Firm* — Hodgson Russ LLP

(57) ABSTRACT

A method for wireless communication, a terminal device, and a network device are provided. The method includes the following. A terminal device determines a physical uplink control channel (PUCCH) resource, where the PUCCH resource is used for transmitting first uplink control information (UCI) and second UCI, and a priority of the first UCI is different from a priority of the second UCI. The terminal device determines a first number of physical resource blocks (PRB) according to a total number of bits of the first UCI, a total number of bits of the second UCI, a first maximum coding rate corresponding to the first UCI, and a second maximum coding rate corresponding to the second UCI, where the first number of PRBs is less than or equal to a number of PRBs $M_{RB}^{PUCCH}$ in the PUCCH resource. The terminal device transmits target UCI according to the first number of PRBs.

14 Claims, 5 Drawing Sheets

(56) References Cited

U.S. PATENT DOCUMENTS

| | | | |
|---|---|---|---|
| 2022/0124703 A1 | 4/2022 | Lin et al. | |
| 2022/0191882 A1* | 6/2022 | Lee | H04W 72/56 |
| 2022/0232558 A1* | 7/2022 | Shin | H04W 76/28 |
| 2022/0287054 A1* | 9/2022 | Kim | H04L 5/0064 |
| 2022/0304027 A1* | 9/2022 | Yang | H04W 72/23 |
| 2022/0353891 A1* | 11/2022 | Kang | H04W 72/21 |
| 2022/0394702 A1* | 12/2022 | Lee | H04L 5/0069 |
| 2023/0046263 A1* | 2/2023 | Wong | H04W 72/569 |
| 2023/0107391 A1* | 4/2023 | Wu | H04W 72/0453 |
| | | | 370/329 |
| 2023/0291451 A1* | 9/2023 | Su | H04L 1/08 |
| 2023/0379916 A1* | 11/2023 | Yin | H04L 1/1812 |
| 2024/0106611 A1* | 3/2024 | Wang | H04L 5/0053 |

FOREIGN PATENT DOCUMENTS

| | | |
|---|---|---|
| CN | 111314033 | 6/2020 |
| CN | 111567006 | 8/2020 |
| CN | 111771389 | 10/2020 |
| CN | 111835480 | 10/2020 |
| EP | 3742650 | 11/2020 |
| WO | 2019130521 | 7/2019 |
| WO | 2021003724 | 1/2021 |

OTHER PUBLICATIONS

"3rd Generation Partnership Project; Technical Specification Group Radio Access Network; NR; Physical layer procedures for control (Release 16)," 3GPP TS 38.213, Dec. 2020, v16.4.0.

WIPO, International Search Report and Written Opinion for International Application No. PCT/CN2021/073411, Oct. 14, 2021.

* cited by examiner

200

```
┌─────────────────────────────────────────────────┐
│ DETERMINE, BY A TERMINAL DEVICE, A PUCCH RESOURCE,│
│ WHERE THE PUCCH RESOURCE IS USED FOR TRANSMITTING │──S210
│ FIRST UCI AND SECOND UCI, AND A PRIORITY OF THE FIRST│
│ UCI IS DIFFERENT FROM A PRIORITY OF THE SECOND UCI│
└─────────────────────────────────────────────────┘
                         │
┌─────────────────────────────────────────────────┐
│ DETERMINE, BY THE TERMINAL DEVICE, A FIRST NUMBER OF│
│   PRBS ACCORDING TO A TOTAL NUMBER OF BITS OF THE   │
│  FIRST UCI, A TOTAL NUMBER OF BITS OF THE SECOND UCI, A│
│   FIRST MAXIMUM CODING RATE CORRESPONDING TO THE    │──S220
│      FIRST UCI, AND A SECOND MAXIMUM CODING RATE    │
│   CORRESPONDING TO THE SECOND UCI, WHERE THE FIRST  │
│  NUMBER OF PRBS IS LESS THAN OR EQUAL TO A NUMBER OF│
│             PRBS IN THE PUCCH RESOURCE              │
└─────────────────────────────────────────────────┘
                         │
┌─────────────────────────────────────────────────┐
│   TRANSMIT, BY THE TERMINAL DEVICE, TARGET UCI      │
│  ACCORDING TO THE FIRST NUMBER OF PRBS, WHERE THE   │──S230
│  TARGET UCI INCLUDES PART OR ALL OF INFORMATION IN  │
│   THE FIRST UCI AND PART OR ALL OF INFORMATION IN THE│
│                    SECOND UCI                       │
└─────────────────────────────────────────────────┘
```

```
┌─────────────────────────────────────────────────────┐
│ DETERMINE, BY A NETWORK DEVICE, A PUCCH RESOURCE,   │
│ WHERE THE PUCCH RESOURCE IS USED FOR TRANSMITTING   │──S310
│ FIRST UCI AND SECOND UCI, AND A PRIORITY OF THE FIRST│
│ UCI IS DIFFERENT FROM A PRIORITY OF THE SECOND UCI  │
└─────────────────────────────────────────────────────┘
```

DETERMINE, BY THE NETWORK DEVICE, A FIRST NUMBER OF PRBS ACCORDING TO A TOTAL NUMBER OF BITS OF THE FIRST UCI, A TOTAL NUMBER OF BITS OF THE SECOND UCI, A FIRST MAXIMUM CODING RATE CORRESPONDING TO THE FIRST UCI, AND A SECOND MAXIMUM CODING RATE CORRESPONDING TO THE SECOND UCI, WHERE THE FIRST NUMBER OF PRBS IS LESS THAN OR EQUAL TO A NUMBER OF PRBS IN THE PUCCH RESOURCE ─ S320

RECEIVE, BY THE NETWORK DEVICE, TARGET UCI ACCORDING TO THE FIRST NUMBER OF PRBS, WHERE THE TARGET UCI INCLUDES PART OR ALL OF INFORMATION IN THE FIRST UCI AND PART OR ALL OF INFORMATION IN THE SECOND UCI ─ S330

FIG. 3

METHOD FOR WIRELESS COMMUNICATION, TERMINAL DEVICE, AND NETWORK DEVICE

CROSS REFERENCE TO RELATED APPLICATION(S)

This application is a continuation of International Application No. PCT/CN2021/073411, filed Jan. 22, 2021, the entire disclosure of which is incorporated herein by reference.

TECHNICAL FIELD

This disclosure relates to the field of communication, and more particularly, to a method for wireless communication, a terminal device, and a network device.

BACKGROUND

In new radio (NR) release 15 (Rel-15), terminals determine a physical uplink control channel (PUCCH) resource used for transmitting uplink control information (UCI). The format of the PUCCH resource, the number of physical resource blocks (PRB) occupied by the PUCCH resource in the frequency domain, and a maximum coding rate corresponding to the PUCCH resource are semi-statically configured via higher-layer signaling. To improve an uplink (UL) resource utilization rate, the terminal dynamically determines the number of PRBs actually used for transmitting the PUCCH according to the number of bits of UCI to-be-transmitted and a maximum coding rate corresponding to the UCI to-be-transmitted.

In NR release 16 (Rel-16), a high priority and a low priority are introduced for UL channels in a physical layer to support ultra-reliable low latency communications (URLLC) transmission. Specifically, an UL channel corresponding to priority index 0 represents a low-priority channel, and an UL channel corresponding to priority index 1 represents a high-priority channel. Channels with different priorities have different transmission performance requirements including reliability and time delay. In the NR Rel-16 system, when UL channels with different priorities overlap in the time domain, only a high-priority channel is transmitted, and a low-priority channel is discarded. That is, transmission of the high-priority channel is ensured preferentially.

In NR release 17 (Rel-17), to reduce the impact of discarding low-priority UL channels on system efficiency, multiplexing transmission of information carried in overlapped channels with different priorities is supported. During multiplexing transmission, the performance requirements (reliability and time delay) of high-priority information (i.e., information carried in the high-priority channel) are required to be ensured first. If multiplexed information is transmitted according to a transmission parameter corresponding to the high-priority information, resource waste may be caused. For example, generally, a maximum coding rate corresponding to high-priority UCI is significantly lower than a maximum coding rate corresponding to low-priority UCI. To ensure reliability of the high-priority UCI, if PRBs occupied by the transmission of the multiplexed information is determined according to the low coding rate corresponding to the high-priority UCI, the number of physical resources occupied by the low-priority UCI will be significantly greater than the number of physical resources required according to performance requirements of the low-priority UCI, resulting in resource waste. Therefore, when supporting multiplexing transmission of information with different priorities, how to take account of system efficiency on the basis of ensuring reliability of high-priority UCI is a technical problem to-be-solved in the art.

SUMMARY

In a first aspect, a method for wireless communication is provided. The method includes the following. A terminal device determines a physical uplink control channel (PUCCH) resource, where the PUCCH resource is used for transmitting first UCI and second UCI, and a priority of the first UCI is different from a priority of the second UCI. The terminal device determines a first number (that is, quantity) of physical resource blocks (PRB) according to a total number of bits of the first UCI, a total number of bits of the second UCI, a first maximum coding rate corresponding to the first UCI, and a second maximum coding rate corresponding to the second UCI, where the first number of PRBs is less than or equal to a number of PRBs $M_{RB}^{PUCCH}$ in the PUCCH resource. The terminal device transmits target UCI according to the first number of PRBs, where the target UCI includes part or all of information in the first UCI and part or all of information in the second UCI.

In a second aspect, a terminal device is provided. The terminal device includes a transceiver, a processor, and a memory. The memory is configured to store computer programs, and the processor is configured to invoke and execute the computer programs stored in the memory to: determine a PUCCH resource, where the PUCCH resource is used for transmitting first UCI and second UCI, and a priority of the first UCI is different from a priority of the second UCI; determine a first number of PRBs according to a total number of bits of the first UCI, a total number of bits of the second UCI, a first maximum coding rate corresponding to the first UCI, and a second maximum coding rate corresponding to the second UCI, where the first number of PRBs is less than or equal to a number of PRBs $M_{RB}^{PUCCH}$ in the PUCCH resource; and cause the transceiver to transmit target UCI according to the first number of PRBs, where the target UCI includes part or all of information in the first UCI and part or all of information in the second UCI.

In a third aspect, a network device is provided. The network device includes a transceiver, a processor, and a memory. The memory is configured to store computer programs, and the processor is configured to invoke and execute the computer programs stored in the memory to: determine a PUCCH resource, where the PUCCH resource is used for transmitting first UCI and second UCI, and a priority of the first UCI is different from a priority of the second UCI; determine a first number of PRBs according to a total number of bits of the first UCI, a total number of bits of the second UCI, a first maximum coding rate corresponding to the first UCI, and a second maximum coding rate corresponding to the second UCI, where the first number of PRBs is less than or equal to a number of PRBs $M_{RB}^{PUCCH}$ in the PUCCH resource; and cause the transceiver to receive target UCI according to the first number of PRBs, where the target UCI includes part or all of information in the first UCI and part or all of information in the second UCI.

BRIEF DESCRIPTION OF THE DRAWINGS

FIGS. 2 and 3 are schematic flowcharts illustrating a method for wireless communication provided in implementations of the disclosure.

DETAILED DESCRIPTION

The following will describe technical solutions of implementations of the disclosure with reference to accompanying drawings. Apparently, implementations described herein are merely some implementations, rather than all implementations, of the disclosure. For the implementations described herein, all other implementations obtained by those of ordinary skill in the art without creative effort shall fall within the scope of protection of the disclosure.

Figure 1:
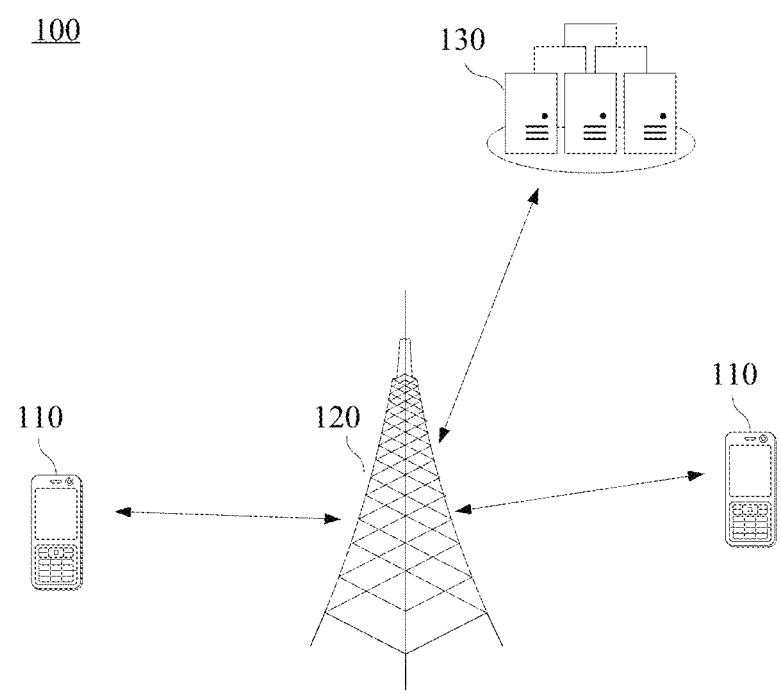
FIG. 1 illustrates an example of an architecture of a communication system applied in implementations of the disclosure.

FIG. 1 is a schematic diagram illustrating an application scenario according to implementations of the disclosure.

As illustrated in FIG. 1, a communication system 100 may include a terminal device 110 and a network device 120. The network device 120 can communicate with the terminal device 110 via an air interface. The terminal device 110 and the network device 120 support a multi-service transmission.

It can be understood that, in implementations of the disclosure, the communication system 100 is used simply for exemplarily illustration rather than limitation. That is, the technical solutions of implementations of the disclosure are applicable to various communication systems. The various communication systems may include a long term evolution (LTE) system, an LTE time division duplex (TDD) system, a universal mobile telecommunication system (UMTS), a 5th generation (5G) communication system (also referred to as a new radio (NR) communication system), or a future communication system.

In the communication system 100 as illustrated in FIG. 1, the network device 120 may be an access network device that communicates with the terminal device 110. The access network device can provide a communication coverage for a specific geographic area and communicate with terminal devices 110 (e.g., a user equipment (UE)) in the coverage area.

The network device 120 may be an evolved NodeB (eNB or eNodeB) in the LTE system, a next generation radio access network (NG RAN) device, a gNB in the NR system, or a radio controller in a cloud radio access network (CRAN). Alternatively, the network device 120 may also be a relay station, an access point (AP), an in-vehicle device, a wearable device, a hub, a switch, a bridge, a router, or a network device in a future evolved public land mobile network (PLMN).

The terminal device 110 may be any terminal device, which includes, but is not limited to, a terminal device that connects to the network device 120 or other terminal devices in a wired or wireless manner.

For example, the terminal device 110 may be referred to as an access terminal, a UE, a subscriber unit, a subscriber station, a mobile station, a remote station, a remote terminal, a mobile device, a user terminal, a terminal, a wireless communication device, a user agent, a user device, etc. The access terminal may be a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, or a terminal device in a 5G network, a terminal device in a future evolved network, etc.

The terminal device 110 can be configured for device to device (D2D) communication.

The wireless communication system 100 may further include a core network device 130 that communicates with a base station. The core network device 130 may be a 5G core (5GC) device, an access and mobility management function (AMF) device, an authentication server function (AUSF) device, a user plane function (UPF) device, or a session management function (SMF) device. Optionally, the core network device 130 may also be an evolved packet core (EPC) device in the LTE network such as a session management function+core packet gateway (SMF+PGW-C) device. It can be understood that, the SMF+PGW-C device can implement functions of both SMF and PGW-C. With the evolution of the network, the core network device may also have other names, or a new network entity can be formed by dividing functions of the core network, which will not be limited herein.

Various functional units in the communication system 100 may establish a connection with one another via a next generation (NG) interface for communication.

For example, the terminal device establishes an air interface connection with the access network device via an NR interface to transmit user-plane data and control-plane signaling. The terminal device can establish a control-plane signaling connection with the AMF device via NG interface 1 (N1 for short). The access network device, e.g., a next generation wireless access base station (gNB), can establish a user-plane data connection with the UPF device via NG interface 3 (N3 for short). The access network device can establish a control-plane signaling connection with the AMF device via NG interface 2 (N2 for short). The UPF device can establish a control-plane signaling connection with the SMF device via NG interface 4 (N4 for short). The UPF device can exchange user-plane data with a data network via NG interface 6 (N6 for short). The AMF device can establish a control-plane signaling connection with the SMF device via NG interface 11 (N11 for short). The SMF device can establish a control-plane signaling connection with a policy control function (PCF) device via NG interface 7 (N7 for short).

FIG. 1 exemplarily illustrates a base station, a core network device, and two terminal devices. Optionally, the wireless communication system 100 may include multiple base stations and the other number of terminal devices that may be included in a coverage range of each of the multiple base stations, which will not be limited in implementations of the disclosure.

It can be understood that, a device with a communication function in a network/system in implementations of the disclosure can be referred to as a communication device. The communication system 100 illustrated in FIG. 1 is illustrated as an example, the communication device may include the network device 120 and the terminal device 110 that have communication functions, and the network device 120 and the terminal device 110 may be the above-mentioned devices, which will not be repeated herein. The communication device may further include other devices in the communication system 100, e.g., a network controller, a mobile management entity (MME), or other network entities, which will not be limited in implementations of the disclosure.

It should be understood that, the terms "system" and "network" herein are usually interchangeable. The term "and/or" herein is used to describe an association relationship between associated objects and represents that three relationships may exist. For example, A and/or B may represent the following three cases: only A exists, both A and B exist, and only B exists. The character "/" herein generally indicates an "or" relationship between the associated objects.

In NR release 15 (Rel-15), a terminal determines a physical uplink control channel (PUCCH) resource used for transmitting uplink control information (UCI). The format of the PUCCH resource, the number of physical resource blocks (PRB) occupied by the PUCCH resource in the frequency domain, and a maximum coding rate corresponding to the PUCCH resource are semi-statically configured via higher-layer signaling. To improve an uplink (UL) resource utilization rate, the terminal dynamically determines the number of PRBs actually used for transmitting the PUCCH according to the number of bits of UCI to-be-transmitted and a maximum coding rate corresponding to the UCI to-be-transmitted.

Transmission of acknowledge/negative acknowledge (ACK/NACK) information is illustrated as an example. If the minimum number of PRBs $M_{RB,min}^{PUCCH}$ used for transmitting the ACK/NACK information in the PUCCH resource satisfies: $(O_{ACK}+O_{CRC}) \leq M_{RB,min}^{PUCCH} \cdot N_{sc,ctrl}^{RB} \cdot N_{symb-UCI}^{PUCCH} \cdot Q_m \cdot r$, and $M_{RB,min}^{PUCCH}$ is less than or equal to $M_{RB}^{PUCCH}$ the terminal determines that the number of PRBs actually used is $M_{RB,min}^{PUCCH}$, where $R_{RB}^{PUCCH}$ represents the number of PRBs semi-statically configured by the network device via higher-layer signaling. If $(O_{ACK}+O_{CRC}) > M_{RB}^{PUCCH} \cdot N_{sc,ctrl}^{RB} \cdot N_{symb-UCI}^{PUCCH} \cdot Q_m \cdot r$, the terminal determines that the number of PRBs actually used is $M_{RB}^{PUCCH}$, where $M_{RB}^{PUCCH}$ represents the number of PRBs in the PUCCH resource.

The parameters above are defined as follows.

$O_{ACK}$ represents the total number of bits of the ACK/NACK information.

$O_{CRC}$ represents the number of cyclic redundancy check (CRC) bits corresponding to the ACK/NACK information.

r represents a maximum coding rate configured by the network device for a PUCCH format used by the PUCCH resource.

$N_{sc,ctrl}^{RB}$ represents a parameter determined according to the PUCCH format used by the PUCCH resource and the number of subcarriers in a PRB in the PUCCH resource, or a parameter determined according to the PUCCH format used by the PUCCH resource, the number of subcarriers in the PRB in the PUCCH resource, and a code length of an orthogonal code used by the PUCCH format. $N_{sc,ctrl}^{RB} = N_{sc}^{RB} - 4$ for PUCCH format 2, or if PUCCH format 2 uses an orthogonal code with length $N_{SF}^{PUCCH,2}$, $N_{sc,ctrl}^{RB} = (N_{sc}^{RB} - 4)/N_{SF}^{PUCCH,2}$. $N_{sc,ctrl}^{RB} = N_{sc}^{RB}$ for PUCCH format 3, or if PUCCH format 3 uses an orthogonal code with length $N_{SF}^{PUCCH,3}$, $N_{sc,ctrl}^{RB} = N_{sc}^{RB}/N_{SF}^{PUCCH,3}$. $N_{sc,ctrl}^{RB} = N_{sc}^{RB}/N_{SF}^{PUCCH,4}$ for PUCCH format 4, where $N_{sc}^{RB}$ is the number of subcarriers per resource block, for example, $N_{sc}^{RB} = 12$ in the NR system.

$N_{symb-UCI}^{PUCCH}$ represents the number of symbols in the PUCCH resource determined according to the PUCCH format. For PUCCH format 2, $N_{symb-UCI}^{PUCCH}$ is equal to the number of symbols in the PUCCH resource. For PUCCH format 3 or for PUCCH format 4, $N_{symb-UCI}^{PUCCH}$ is equal to the total number of symbols in the PUCCH resource after excluding the number of symbols used for demodulation reference signal (DM-RS) transmission.

$Q_m$ represents a modulation order. For PUCCH format 3 or for PUCCH format 4, $Q_m=1$ if pi/2 binary phase shift keying (pi/2-BPSK) is the modulation scheme, and $Q_m=2$ if quadrature phase shift keying (QPSK) is the modulation scheme. For PUCCH format 2, $Q_m=2$.

In NR release 16 (Rel-16), a high priority and a low priority are introduced for UL channels in a physical layer to support ultra-reliable low latency communications (URLLC) transmission. Specifically, an UL channel corresponding to priority index 0 represents a low-priority channel, and an UL channel corresponding to priority index 1 represents a high-priority channel. Channels with different priorities have different transmission performance requirements including reliability and time delay. In the NR Rel-16 system, when UL channels with different priorities overlap in the time domain, only a high-priority channel is transmitted, and a low-priority channel is discarded. That is, transmission of the high-priority channel is ensured preferentially.

In NR release 17 (Rel-17), to reduce the impact of discarding low-priority UL channels on system efficiency, multiplexing transmission of information carried in overlapped channels with different priorities is supported. During multiplexing transmission, the performance requirements (reliability and time delay) of high-priority information (i.e., information carried in the high-priority channel) are required to be ensured first. If multiplexed information is transmitted according to a transmission parameter corresponding to the high-priority information, resource waste may be caused. For example, generally, a maximum coding rate corresponding to high-priority UCI is significantly lower than a maximum coding rate corresponding to low-priority UCI. To ensure reliability of the high-priority UCI, if PRBs occupied by the transmission of the multiplexed information is determined according to the low coding rate corresponding to the high-priority UCI, the number of physical resources occupied by the low-priority UCI will be significantly greater than the number of physical resources required according to performance requirements of the low-priority UCI, resulting in resource waste. Therefore, when supporting multiplexing transmission of information with different priorities, how to take account of system efficiency on the basis of ensuring reliability of high-priority UCI is a technical problem to-be-solved in the art.

A method for wireless communication, a terminal device, and a network device are provided in implementations of the disclosure, which can take account of system efficiency on the basis of ensuring reliability of high-priority UCI when supporting multiplexing transmission of information with different priorities.

FIG. 2 is a schematic flowchart illustrating a method for wireless communication 200 provided in implementations of the disclosure. The method 200 can be performed by a terminal device, for example, the terminal device as illustrated in FIG. 1.

As illustrated in FIG. 2, the method 200 may include the following.

S210, the terminal device determines a PUCCH resource, where the PUCCH resource is used for transmitting first UCI and second UCI, and a priority of the first UCI is different from a priority of the second UCI.

S220, the terminal device determines a first number of PRBs according to a total number of bits of the first UCI, a total number of bits of the second UCI, a first maximum coding rate corresponding to the first UCI, and a second maximum coding rate corresponding to the second UCI, where the first number of PRBs is less than or equal to a number of PRBs $M_{RB}^{PUCCH}$ the PUCCH resource.

S230, the terminal device transmits target UCI according to the first number of PRBs, where the target UCI includes part or all of information in the first UCI and part or all of information in the second UCI.

According to the above technical solutions, when supporting multiplexing transmission of information with different priorities, the terminal device determines the first number (that is, quantity) of PRBs used for transmitting the part or all of the information in the first UCI and the part or all of the information in the second UCI according to the total number of bits of the first UCI, the total number of bits of the second UCI, the first maximum coding rate corresponding to the first UCI, and the second maximum coding rate corresponding to the second UCI. That is, the terminal device can determine the first number of PRBs according to physical resources required for the first UCI and physical resources required for the second UCI, thereby taking account of system efficiency on the basis of ensuring reliability of high-priority UCI.

For example, the number of PRBs in the PUCCH resource (that is, the number of PRBs occupied by the PUCCH resource in the frequency domain), the first maximum coding rate, and the second maximum coding rate are semi-statically configured via higher-layer signaling. The terminal device determines the first number of PRBs according to the total number of bits of the first UCI, the total number of bits of the second UCI, the number of PRBs configured in the PUCCH resource, the first maximum coding rate, and the second maximum coding rate.

It should be noted that, implementations of the disclosure are intended for multiplexing transmission of the first UCI and the second UCI with different priorities on one PUCCH resource. In other words, the terminal device can determine the number of PRBs in the PUCCH resource actually occupied for transmitting the first UCI and the second UCI according to the number of bits of high-priority UCI, a maximum coding rate of the high-priority UCI, the number of bits of low-priority UCI, and a maximum coding rate of the low-priority UCI. The priority of the first UCI and the priority of the second UCI are not specifically limited in implementations of the disclosure. The priority of the first UCI and the priority of the second UCI can be identified by a priority index.

In addition, the target UCI in implementations of the disclosure includes the part or all of the information in the first UCI and the part or all of the information in the second UCI, but specific information in the target UCI is not specifically limited in implementations of the disclosure. For example, if the priority of the first UCI is higher than the priority of the second UCI, the target UCI may include all of the information in the first UCI and part of the information in the second UCI, or the target UCI may include all of the information in the first UCI and all of the information in the second UCI.

In some implementations of the disclosure, the operation at S220 may include the following. The terminal device determines the first number of PRBs according to a first parameter and a second parameter, where a value of the first parameter is equal to a sum of the total number of bits of the first UCI and a number of CRC bits corresponding to the first UCI divided by the first maximum coding rate, and a value of the second parameter is equal to a sum of the total number of bits of the second UCI and a number of CRC bits corresponding to the second UCI divided by the second maximum coding rate.

For example, on condition that the minimum number of PRBs used for transmitting the target UCI in the PUCCH resource satisfies a preset condition or a preset formula and is less than or equal to the number of PRBs in the PUCCH resource, the terminal device determines the minimum number of PRBs as the first number of PRBs. The terminal device determines the number of PRBs in the PUCCH resource as the first number of PRBs on condition that the number of PRBs in the PUCCH resource fails to satisfy the preset formula or the preset condition.

In some implementations of the disclosure, the operation at S220 may include the following. The terminal device determines a minimum number of PRBs $M_{RB,min}^{PUCCH}$ used for transmitting the first UCI and the second UCI in the PUCCH resource according to the total number of bits of the first UCI, the total number of bits of the second UCI, the first maximum coding rate, and the second maximum coding rate. The terminal device determines $M_{RB,min}^{PUCCH}$ as the first number of PRBs on condition that $M_{RB,min}^{PUCCH}$ is less than or equal to $M_{RB}^{PUCCH}$.

In an implementation manner, $M_{RB,min}^{PUCCH}$ satisfies:

$$\frac{O_{UCI0} + O_{CRC0}}{r_0} + \frac{O_{UCI1} + O_{CRC1}}{r_1} \leq M_{RB,min}^{PUCCH} \cdot N_{sc,ctrl}^{RB} \cdot N_{symb-UCI}^{PUCCH} \cdot Q_m, \quad (1)$$

where $O_{UCI0}$ represents the total number of bits of the first UCI, $O_{CRC0}$ represents a number of CRC bits corresponding to the first UCI, $O_{CRC0}$ is greater than or equal to 0, $r_0$ represents the first maximum coding rate, $O_{UCI1}$ represents the total number of bits of the second UCI, $O_{CRC1}$ represents a number of CRC bits corresponding to the second UCI, $O_{CRC1}$ is greater than or equal to 0, $r_1$ represents the second maximum coding rate, $N_{sc,ctrl}^{RB}$ represents a parameter determined according to a PUCCH format used by the PUCCH resource and a number of subcarriers in a PRB in the PUCCH resource, or a parameter determined according to the PUCCH format used by the PUCCH resource, the number of subcarriers in the PRB in the PUCCH resource, and a code length of an orthogonal code used by the PUCCH format, $N_{symb-UCI}^{PUCCH}$ represents a number of symbols in the PUCCH resource determined according to the PUCCH format, and $Q_m$ represents a modulation order.

For example, $N_{sc,ctrl}^{RB} = N_{sc}^{RB} - 4$ for PUCCH format 2, or if PUCCH format 2 uses an orthogonal code with length $N_{SF}^{PUCCH,2}$, $N_{sc,ctrl}^{RB} = (N_{sc}^{RB} - 4)/N_{SF}^{PUCCH,2}$. $N_{sc,ctrl}^{RB} = N_{sc}^{RB}$ for PUCCH format 3, or if PUCCH format 3 uses an orthogonal code with length $N_{SF}^{PUCCH,3}$, $N_{sc,ctrl}^{RB} = N_{sc}^{RB}/N_{SF}^{PUCCH,3}$. $N_{sc,ctrl}^{RB} = N_{sc}^{RB}/N_{SF}^{PUCCH,4}$ for PUCCH format 4, where $N_{sc}^{RB}$ is the number of subcarriers per resource block, for example, $N_{sc}^{RB} = 12$ in the NR system. For PUCCH format 2, $N_{symb-UCI}^{PUCCH}$ is equal to the number of symbols in the PUCCH resource. For PUCCH format 3 or for PUCCH format 4, $N_{symb-UCI}^{PUCCH}$ is equal to the total number of symbols in the PUCCH resource after excluding the number of symbols used for DM-RS transmission. For PUCCH format 3 or for PUCCH format 4, $Q_m = 1$ if pi/2-BPSK is the modulation scheme, and $Q_m = 2$ if QPSK is the modulation scheme. For PUCCH format 2, $Q_m = 2$.

With the solution of formula (1), physical resources occupied by the first UCI and physical resources occupied by the second UCI can be determined at the granularity of physical resource elements (RE). That is, there is one PRB where some REs can be used for transmitting the first UCI and other REs can be used for transmitting the second UCI.

In other words, the terminal device determines $M_{RB,min}^{PUCCH}$ as the first number of PRBs on condition that $M_{RB,min}^{PUCCH}$ satisfies formula (1).

It should be noted that, various simple modifications can be made to the formula involved in implementations of the disclosure, and the formula subjected to simple modifications also falls within the protection scope of the disclosure.

For example, the above formula (1) can be modified to:

$$\frac{O_{UCI0} + O_{CRC0}}{r_0 \cdot N_{sc,ctrl}^{RB} \cdot N_{symb-UCI}^{PUCCH} \cdot Q_m} + \frac{O_{UCI1} + O_{CRC1}}{r_1 \cdot N_{sc,ctrl}^{RB} \cdot N_{symb-UCI}^{PUCCH} \cdot Q_m} \leq M_{RB,min}^{PUCCH}. \quad (1-1)$$

In an implementation manner, $M_{RB}^{PUCCH} > 1$, and $M_{RB,min}^{PUCCH}$ further satisfies:

$$\frac{O_{UCI0} + O_{CRC0}}{r_0} + \frac{O_{UCI1} + O_{CRC1}}{r_1} > \quad (2)$$
$$(M_{RB,min}^{PUCCCH} - 1) \cdot N_{sc,ctrl}^{RB} \cdot N_{symb-UCI}^{PUCCH} \cdot Q_m.$$

In other words, the terminal device determines $M_{RB,min}^{PUCCH}$ as the first number of PRBs on condition that $M_{RB,min}^{PUCCH}$ satisfies formula (1) and formula (2).

The above formula (2) can also be modified to:

$$\frac{O_{UCI0} + O_{CRC0}}{r_0 \cdot N_{sc,ctrl}^{RB} \cdot N_{symb-UCI}^{PUCCH} \cdot Q_m} + \frac{O_{UCI1} + O_{CRC1}}{r_1 \cdot N_{sc,ctrl}^{RB} \cdot N_{symb-UCI}^{PUCCH} \cdot Q_m} > \quad (2-1)$$
$$(M_{RB,min}^{PUCCH} - 1).$$

In an implementation manner, $M_{RB}^{PUCCH}$ further satisfies:

$$\frac{O_{UCI0} + O_{CRC0}}{r_0} + \frac{O_{UCI1} + O_{CRC1}}{r_1} \leq M_{RB}^{PUCCH} \cdot N_{sc,ctrl}^{RB} \cdot N_{symb-UCI}^{PUCCH} \cdot Q_m. \quad (3)$$

In other words, on condition that $M_{RB}^{PUCCH}$ satisfies formula (3), the terminal device determines whether $M_{RB,min}^{PUCCH}$ satisfies formula (1), and the terminal device determines $M_{RB,min}^{PUCCH}$ as the first number of PRBs on condition that $M_{RB,min}^{PUCCH}$ satisfies formula (1).

The above formula (3) can also be modified to:

$$\frac{O_{UCI0} + O_{CRC0}}{r_0 \cdot N_{sc,ctrl}^{RB} \cdot N_{symb-UCI}^{PUCCH} \cdot Q_m} + \frac{O_{UCI1} + O_{CRC1}}{r_1 \cdot N_{sc,ctrl}^{RB} \cdot N_{symb-UCI}^{PUCCH} \cdot Q_m} \leq M_{RB}^{PUCCH}. \quad (3-1)$$

In some implementations of the disclosure, the method 200 may further include the following. The terminal device determines $M_{RB}^{PUCCH}$ as the first number of PRBs on condition that $M_{RB}^{PUCCH}$ satisfies:

$$\frac{O_{UCI0} + O_{CRC0}}{r_0} + \frac{O_{UCI1} + O_{CRC1}}{r_1} > \quad (4)$$
$$(M_{RB}^{PUCCH} - 1) \cdot N_{sc,ctrl}^{RB} \cdot N_{symb-UCI}^{PUCCH} \cdot Q_m,$$

where $O_{UCI0}$ represents the total number of bits of the first UCI, $O_{CRC0}$ represents a number of CRC bits corresponding to the first UCI, $O_{CRC0}$ is greater than or equal to 0, $r_0$ represents the first maximum coding rate, $O_{UCI1}$ represents the total number of bits of the second UCI, $O_{CRC1}$ represents a number of CRC bits corresponding to the second UCI, $O_{CRC1}$ is greater than or equal to 0, $r_1$ represents the second maximum coding rate, $N_{sc,ctrl}^{RB}$ represents a parameter determined according to a PUCCH format used by the PUCCH resource and a number of subcarriers in a PRB in the PUCCH resource, or a parameter determined according to the PUCCH format used by the PUCCH resource, the number of subcarriers in the PRB in the PUCCH resource, and a code length of an orthogonal code used by the PUCCH format, $N_{symb-UCI}^{PUCCH}$ represents a number of symbols in the PUCCH resource determined according to the PUCCH format, and $Q_m$ represents a modulation order.

For example, $N_{sc,ctrl}^{RB} = N_{sc}^{RB} - 4$ for PUCCH format 2, or if PUCCH format 2 uses an orthogonal code with length $N_{SF}^{PUCCH,2}$, $N_{sc,ctrl}^{RB} = (N_{sc}^{RB} - 4)/N_{SF}^{PUCCH,2}$. $N_{sc,ctrl}^{RB} = N_{sc}^{RB}$ for PUCCH format 3, or if PUCCH format 3 uses an orthogonal code with length $N_{SF}^{PUCCH,3}$, $N_{sc,ctrl}^{RB} = N_{sc}^{RB}/N_{SF}^{PUCCH,3}$. $N_{sc,ctrl}^{RB} = N_{sc}^{RB}/N_{SF}^{PUCCH,4}$ for PUCCH format 4, where $N_{sc}^{RB}$ is the number of subcarriers per resource block, for example, $N_{sc}^{RB} = 12$ in the NR system. For PUCCH format 2, $N_{symb-UCI}^{PUCCH}$ is equal to the number of symbols in the PUCCH resource. For PUCCH format 3 or for PUCCH format 4, $N_{symb-UCI}^{PUCCH}$ is equal to the total number of symbols in the PUCCH resource after excluding the number of symbols used for DM-RS transmission. For PUCCH format 3 or for PUCCH format 4, $Q_m = 1$ if pi/2-BPSK is the modulation scheme, and $Q_m = 2$ if QPSK is the modulation scheme. For PUCCH format 2, $Q_m = 2$.

In other words, the terminal device determines whether $M_{RB}^{PUCCH}$ satisfies formula (4), and determines $M_{RB}^{PUCCH}$ as the first number of PRBs on condition that $M_{RB}^{PUCCH}$ satisfies formula (4).

The above formula (4) can also be modified to:

$$\frac{O_{UCI0} + O_{CRC0}}{r_0 \cdot N_{sc,ctrl}^{RB} \cdot N_{symb-UCI}^{PUCCH} \cdot Q_m} + \frac{O_{UCI1} + O_{CRC1}}{r_1 \cdot N_{sc,ctrl}^{RB} \cdot N_{symb-UCI}^{PUCCH} \cdot Q_m} > \quad (4-1)$$
$$(M_{RB}^{PUCCH} - 1).$$

In some implementations of the disclosure, $M_{RB,min}^{PUCCH}$ satisfies:

$$\left\lceil \frac{O_{UCI0} + O_{CRC0}}{r_0} \right\rceil + \left\lceil \frac{O_{UCI1} + O_{CRC1}}{r_1} \right\rceil \leq \quad (5)$$
$$M_{RB,min}^{PUCCH} \cdot N_{sc,ctrl}^{RB} \cdot N_{symb-UCI}^{PUCCH} \cdot Q_m,$$

where $O_{UCI0}$ represents the total number of bits of the first UCI, $O_{CRC0}$ represents a number of CRC bits corresponding to the first UCI, $O_{CRC0}$ is greater than or equal to 0, $r_0$ represents the first maximum coding rate, $O_{UCI1}$ represents the total number of bits of the second UCI, $O_{CRC1}$ represents a number of CRC bits corresponding to the second UCI, $O_{CRC1}$ is greater than or equal to 0, $r_1$ represents the second maximum coding rate, $N_{sc,ctrl}^{RB}$ represents a parameter determined according to a PUCCH format used by the PUCCH resource and a number of subcarriers in a PRB in the PUCCH resource, or a parameter determined according to the PUCCH format used by the PUCCH resource, the number of subcarriers in the PRB in the PUCCH resource, and a code length of an orthogonal code used by the PUCCH format, $N_{symb-UCI}^{PUCCH}$ represents a number of symbols in the PUCCH resource determined according to the PUCCH format, $Q_m$ represents a modulation order, and $\lceil \ \rceil$ represents a rounding-up operation.

For example, $N_{sc,ctrl}^{RB}=N_{sc}^{RB}-4$ for PUCCH format 2, or if PUCCH format 2 uses an orthogonal code with length $N_{SF}^{PUCCH,2}$, $N_{sc,ctrl}^{RB}=(N_{sc}^{RB}-4)/N_{SF}^{PUCCH,2}$. $N_{sc,ctrl}^{RB}=N_{sc}^{RB}$ for PUCCH format 3, or if PUCCH format 3 uses an orthogonal code with length $N_{SF}^{PUCCH,3}$, $N_{sc,ctrl}^{RB}=N_{sc}^{RB}/N_{SF}^{PUCCH,3}$. $N_{sc,ctrl}^{RB}=N_{sc}^{RB}/N_{SF}^{PUCCH,4}$ for PUCCH format 4, where $N_{sc}^{RB}$ is the number of subcarriers per resource block, for example, $N_{sc}^{RB}=12$ in the NR system. For PUCCH format 2, $N_{symb-UCI}^{PUCCH}$ is equal to the number of symbols in the PUCCH resource. For PUCCH format 3 or for PUCCH format 4, $N_{symb-UCI}^{PUCCH}$ is equal to the total number of symbols in the PUCCH resource after excluding the number of symbols used for DM-RS transmission. For PUCCH format 3 or for PUCCH format 4, $Q_m=1$ if pi/2-BPSK is the modulation scheme, and $Q_m=2$ if QPSK is the modulation scheme. For PUCCH format 2, $Q_m=2$.

With the solution of formula (5), physical resources occupied by the first UCI and physical resources occupied by the second UCI can be determined at the granularity of PRBs. That is, the first UCI can be distinguished from the second UCI in the frequency domain. In other words, the first UCI is carried in some PRBs, and the second UCI is carried in other PRBs. As such, other optimization processing can be performed on different frequency-domain resources (PRBs), thereby improving a system performance.

In other words, the terminal device determines $M_{RB,min}^{PUCCH}$ as the first number of PRBs on condition that $M_{RB,min}^{PUCCH}$ satisfies formula (5).

The above formula (5) can also be modified to:

$$\left\lceil \frac{O_{UCI0}+O_{CRC0}}{r_0 \cdot N_{sc,ctrl}^{RB} \cdot N_{symb-UCI}^{PUCCH} \cdot Q_m} \right\rceil + \left\lceil \frac{O_{UCI1}+O_{CRC1}}{r_1 \cdot N_{sc,ctrl}^{RB} \cdot N_{symb-UCI}^{PUCCH} \cdot Q_m} \right\rceil \le M_{RB,min}^{PUCCH}. \quad (5-1)$$

In an implementation manner, $M_{RB}^{PUCCH}>1$, and $M_{RB,min}^{PUCCH}$ further satisfies:

$$\left\lceil \frac{O_{UCI0}+O_{CRC0}}{r_0} \right\rceil + \left\lceil \frac{O_{UCI1}+O_{CRC1}}{r_1} \right\rceil > \quad (6)$$
$$(M_{RB,min}^{PUCCH}-1) \cdot N_{sc,ctrl}^{RB} \cdot N_{symb-UCI}^{PUCCH} \cdot Q_m.$$

In other words, the terminal device determines $M_{RB,min}^{PUCCH}$ as the first number of PRBs on condition that $M_{RB,min}^{PUCCH}$ satisfies formula (5) and formula (6).

The above formula (6) can also be modified to:

$$\left\lceil \frac{O_{UCI0}+O_{CRC0}}{r_0 \cdot N_{sc,ctrl}^{RB} \cdot N_{symb-UCI}^{PUCCH} \cdot Q_m} \right\rceil + \left\lceil \frac{O_{UCI1}+O_{CRC1}}{r_1 \cdot N_{sc,ctrl}^{RB} \cdot N_{symb-UCI}^{PUCCH} \cdot Q_m} \right\rceil > \quad (6-1)$$
$$(M_{RB,min}^{PUCCH}-1).$$

In an implementation manner, $M_{RB}^{PUCCH}$ further satisfies:

$$\left\lceil \frac{O_{UCI0}+O_{CRC0}}{r_0} \right\rceil + \left\lceil \frac{O_{UCI1}+O_{CRC1}}{r_1} \right\rceil \le \quad (7)$$
$$M_{RB}^{PUCCH} \cdot N_{sc,ctrl}^{RB} \cdot N_{symb-UCI}^{PUCCH} \cdot Q_m.$$

In other words, on condition that $M_{RB}^{PUCCH}$ satisfies formula (7), the terminal device determines whether $M_{RB,min}^{PUCCH}$ satisfies formula (5), and the terminal device determines $M_{RB,min}^{PUCCH}$ as the first number of PRBs on condition that $M_{RB,min}^{PUCCH}$ satisfies formula (5).

The above formula (7) can also be modified to:

$$\left\lceil \frac{O_{UCI0}+O_{CRC0}}{r_0 \cdot N_{sc,ctrl}^{RB} \cdot N_{symb-UCI}^{PUCCH} \cdot Q_m} \right\rceil + \left\lceil \frac{O_{UCI1}+O_{CRC1}}{r_1 \cdot N_{sc,ctrl}^{RB} \cdot N_{symb-UCI}^{PUCCH} \cdot Q_m} \right\rceil \le M_{RB}^{PUCCH}. \quad (7-1)$$

In some implementations of the disclosure, the method 200 may further include the following. The terminal device determines $M_{RB}^{PUCCH}$ as the first number of PRBs on condition that $M_{RB}^{PUCCH}$ satisfies:

$$\left\lceil \frac{O_{UCI0}+O_{CRC0}}{r_0} \right\rceil + \left\lceil \frac{O_{UCI1}+O_{CRC1}}{r_1} \right\rceil > \quad (8)$$
$$(M_{RB}^{PUCCH}-1) \cdot N_{sc,ctrl}^{RB} \cdot N_{symb-UCI}^{PUCCH} \cdot Q_m,$$

where $O_{UCI0}$ represents the total number of bits of the first UCI, $O_{CRC0}$ represents a number of CRC bits corresponding to the first UCI, $O_{CRC0}$ is greater than or equal to 0, $r_0$ represents the first maximum coding rate, $O_{UCI1}$ represents the total number of bits of the second UCI, $O_{CRC1}$ represents a number of CRC bits corresponding to the second UCI, $O_{CRC1}$ is greater than or equal to 0, $r_1$ represents the second maximum coding rate, $N_{sc,ctrl}^{RB}$ represents a parameter determined according to a PUCCH format used by the PUCCH resource and a number of subcarriers in a PRB in the PUCCH resource, or a parameter determined according to the PUCCH format used by the PUCCH resource, the number of subcarriers in the PRB in the PUCCH resource, and a code length of an orthogonal code used by the PUCCH format, $N_{symb-UCI}^{PUCCH}$ represents a number of symbols in the PUCCH resource determined according to the PUCCH format, $Q_m$ represents a modulation order, and $\lceil \ \rceil$ represents a rounding-up operation.

For example, $N_{sc,ctrl}^{RB}=N_{sc}^{RB}-4$ for PUCCH format 2, or if PUCCH format 2 uses an orthogonal code with length $N_{SF}^{PUCCH,2}$, $N_{sc,ctrl}^{RB}=(N_{sc}^{RB}-4)/N_{SF}^{PUCCH,2}$. $N_{sc,ctrl}^{RB}=N_{sc}^{RB}$ for PUCCH format 3, or if PUCCH format 3 uses an orthogonal code with length $N_{SF}^{PUCCH,3}$, $N_{sc,ctrl}^{RB}=N_{sc}^{RB}/N_{SF}^{PUCCH,3}$. $N_{sc,ctrl}^{RB}=N_{sc}^{RB}/N_{SF}^{PUCCH,4}$ for PUCCH format 4, where $N_{sc}^{RB}$ is the number of subcarriers per resource block, for example, $N_{sc}^{RB}=12$ in the NR system. For PUCCH format 2, $N_{symb-UCI}^{PUCCH}$ is equal to the number of symbols in the PUCCH resource. For PUCCH format 3 or for PUCCH format 4, $N_{symb-UCI}^{PUCCH}$ is equal to the total number of symbols in the PUCCH resource after excluding the number of symbols used for DM-RS transmission. For PUCCH format 3 or for PUCCH format 4, $Q_m=1$ if pi/2-

BPSK is the modulation scheme, and $Q_m=2$ if QPSK is the modulation scheme. For PUCCH format 2, $Q_m=2$.

In other words, the terminal device determines whether $M_{RB}^{PUCCH}$ satisfies formula (8), and determines $M_{RB}^{PUCCH}$ as the first number of PRBs on condition that $M_{RB}^{PUCCH}$ satisfies formula (8).

The above formula (8) can also be modified to:

$$\left\lceil \frac{O_{UCI0}+O_{CRC0}}{r_0 \cdot N_{sc,ctrl}^{RB} \cdot N_{symb-UCI}^{PUCCH} \cdot Q_m} \right\rceil + \left\lceil \frac{O_{UCI1}+O_{CRC1}}{r_1 \cdot N_{sc,ctrl}^{RB} \cdot N_{symb-UCI}^{PUCCH} \cdot Q_m} \right\rceil > \left( M_{RB}^{PUCCH} - 1 \right). \quad (8\text{-}1)$$

Exemplary implementations of the disclosure have been described in detail above in conjunction with the accompanying drawings. However, the disclosure is not limited to the details of the above implementations. Various simple modifications can be made to the technical solutions of the disclosure within the scope of the technical concept of the disclosure, and such simple modifications shall be within the protection scope of the disclosure. For example, all the specific technical features described in the above specific implementations can be combined with each other in any proper manner without conflict. To avoid unnecessary repetition, various possible manners of combination will not be elaborated in the disclosure. For another example, various different implementations of the disclosure can also be randomly combined without departing from the spirit of the disclosure, and such combination should also be regarded as content disclosed by the disclosure.

It can also be understood that, in various method implementations described herein, the magnitude of a sequence number of each process does not mean an order of execution, and the order of execution of each process should be determined by its function and an internal logic and shall not constitute any limitation to an implementation process of implementations of the disclosure.

The above describes in detail the method according to implementations of the disclosure from the viewpoint of the terminal device, and the following will describe in detail a method according to implementations of the disclosure from the viewpoint of the network device.

FIG. 3 is a schematic flowchart illustrating a method for wireless communication 300 provided in implementations of the disclosure. The method 300 can be performed by the network device as illustrated in FIG. 1.

As illustrated in FIG. 3, the method may include the following.

S310, the network device determines a PUCCH resource, where the PUCCH resource is used for transmitting first UCI and second UCI, and a priority of the first UCI is different from a priority of the second UCI.

S320, the network device determines a first number of PRBs according to a total number of bits of the first UCI, a total number of bits of the second UCI, a first maximum coding rate corresponding to the first UCI, and a second maximum coding rate corresponding to the second UCI, where the first number of PRBs is less than or equal to a number of PRBs $M_{RB}^{PUCCH}$ the PUCCH resource.

S330, the network device receives target UCI according to the first number of PRBs, where the target UCI includes part or all of information in the first UCI and part or all of information in the second UCI.

In some implementations of the disclosure, the operation at S320 may include the following. The network device determines the first number of PRBs according to a first parameter and a second parameter, where a value of the first parameter is equal to a sum of the total number of bits of the first UCI and a number of CRC bits corresponding to the first UCI divided by the first maximum coding rate, and a value of the second parameter is equal to a sum of the total number of bits of the second UCI and a number of CRC bits corresponding to the second UCI divided by the second maximum coding rate.

In some implementations of the disclosure, the operation at S320 may include the following. The network device determines a minimum number of PRBs $M_{RB,min}^{PUCCH}$ min used for transmitting the first UCI and the second UCI in the PUCCH resource according to the total number of bits of the first UCI, the total number of bits of the second UCI, the first maximum coding rate, and the second maximum coding rate. The network device determines $M_{RB,min}^{PUCCH}$ as the first number of PRBs on condition that $M_{RB,min}^{PUCCH}$ is less than or equal to $M_{RB}^{PUCCH}$.

In some implementations of the disclosure, $M_{RB,min}^{PUCCH}$ satisfies:

$$\frac{O_{UCI0}+O_{CRC0}}{r_0} + \frac{O_{UCI1}+O_{CRC1}}{r_1} \leq M_{RB,min}^{PUCCH} \cdot N_{sc,ctrl}^{RB} \cdot N_{symb-UCI}^{PUCCH} \cdot Q_m,$$

where $Q_{UCI0}$ represents the total number of bits of the first UCI, $O_{CRC0}$ represents a number of CRC bits corresponding to the first UCI, $O_{CRC0}$ is greater than or equal to 0, $r_0$ represents the first maximum coding rate, $O_{UCI1}$ represents the total number of bits of the second UCI, $O_{CRC1}$ represents a number of CRC bits corresponding to the second UCI, $O_{CRC1}$ is greater than or equal to 0, $r_1$ represents the second maximum coding rate, $N_{sc,ctrl}^{RB}$ represents a parameter determined according to a PUCCH format used by the PUCCH resource and a number of subcarriers in a PRB in the PUCCH resource, or a parameter determined according to the PUCCH format used by the PUCCH resource, the number of subcarriers in the PRB in the PUCCH resource, and a code length of an orthogonal code used by the PUCCH format, $N_{symb-UCI}^{PUCCH}$ represents a number of symbols in the PUCCH resource determined according to the PUCCH format, and $Q_m$ represents a modulation order.

In some implementations of the disclosure, $M_{RB}^{PUCCH} > 1$, and $M_{RB,min}^{PUCCH}$ further satisfies:

$$\frac{O_{UCI0}+O_{CRC0}}{r_0} + \frac{O_{UCI1}+O_{CRC1}}{r_1} > \left( M_{RB,min}^{PUCCH} - 1 \right) \cdot N_{sc,ctrl}^{RB} \cdot N_{symb-UCI}^{PUCCH} \cdot Q_m.$$

In some implementations of the disclosure, $M_{RB}^{PUCCH}$ further satisfies:

$$\frac{O_{UCI0}+O_{CRC0}}{r_0} + \frac{O_{UCI1}+O_{CRC1}}{r_1} \leq M_{RB}^{PUCCH} \cdot N_{sc,ctrl}^{RB} \cdot N_{symb-UCI}^{PUCCH} \cdot Q_m.$$

In some implementations of the disclosure, the method 300 may further include the following. The network device determines $M_{RB}^{PUCCH}$ as the first number of PRBs on condition that $M_{RB}^{PUCCH}$ satisfies:

$$\frac{O_{UCI0}+O_{CRC0}}{r_0} + \frac{O_{UCI1}+O_{CRC1}}{r_1} > \left( M_{RB}^{PUCCH} - 1 \right) \cdot N_{sc,ctrl}^{RB} \cdot N_{symb-UCI}^{PUCCH} \cdot Q_m,$$

where $O_{UCI0}$ represents the total number of bits of the first UCI, $O_{CRC0}$ represents a number of CRC bits corresponding to the first UCI, $O_{CRC0}$ is greater than or equal to 0, $r_0$ represents the first maximum coding rate, $O_{UCI1}$ represents the total number of bits of the second UCI, $O_{CRC1}$ represents a number of CRC bits corresponding to the second UCI, $O_{CRC1}$ is greater than or equal to 0, $r_1$ represents the second maximum coding rate, $N_{sc,ctrl}^{RB}$ represents a parameter determined according to a PUCCH format used by the PUCCH resource and a number of subcarriers in a PRB in the PUCCH resource, or a parameter determined according to the PUCCH format used by the PUCCH resource, the number of subcarriers in the PRB in the PUCCH resource, and a code length of an orthogonal code used by the PUCCH format, $N_{symb-UCI}^{PUCCH}$ represents a number of symbols in the PUCCH resource determined according to the PUCCH format, and $Q_m$ represents a modulation order.

In some implementations of the disclosure, $M_{RB,min}^{PUCCH}$ satisfies:

$$\left\lceil \frac{O_{UCI0} + O_{CRC0}}{r_0} \right\rceil + \left\lceil \frac{O_{UCI1} + O_{CRC1}}{r_1} \right\rceil \leq M_{RB,min}^{PUCCH} \cdot N_{sc,ctrl}^{RB} \cdot N_{symb-UCI}^{PUCCH} \cdot Q_m,$$

where $O_{UCI0}$ represents the total number of bits of the first UCI, $O_{CRC0}$ represents a number of CRC bits corresponding to the first UCI, $O_{CRC0}$ is greater than or equal to 0, $r_0$ represents the first maximum coding rate, $O_{UCI1}$ represents the total number of bits of the second UCI, $O_{CRC1}$ represents a number of CRC bits corresponding to the second UCI, $O_{CRC1}$ is greater than or equal to 0, $r_1$ represents the second maximum coding rate, $N_{sc,ctrl}^{RB}$ represents a parameter determined according to a PUCCH format used by the PUCCH resource and a number of subcarriers in a PRB in the PUCCH resource, or a parameter determined according to the PUCCH format used by the PUCCH resource, the number of subcarriers in the PRB in the PUCCH resource, and a code length of an orthogonal code used by the PUCCH format, $N_{symb-UCI}^{PUCCH}$ represents a number of symbols in the PUCCH resource determined according to the PUCCH format, $Q_m$ represents a modulation order, and $\lceil \; \rceil$ represents a rounding-up operation.

In some implementations of the disclosure, $M_{RB}^{PUCCH} > 1$, and $M_{RB,min}^{PUCCH}$ further satisfies:

$$\left\lceil \frac{O_{UCI0} + O_{CRC0}}{r_0} \right\rceil + \left\lceil \frac{O_{UCI1} + O_{CRC1}}{r_1} \right\rceil > \left(M_{RB,min}^{PUCCH} - 1\right) \cdot N_{sc,ctrl}^{RB} \cdot N_{symb-UCI}^{PUCCH} \cdot Q_m.$$

In some implementations of the disclosure, $M_{RB}^{PUCCH}$ further satisfies:

$$\left\lceil \frac{O_{UCI0} + O_{CRC0}}{r_0} \right\rceil + \left\lceil \frac{O_{UCI1} + O_{CRC1}}{r_1} \right\rceil \leq M_{RB}^{PUCCH} \cdot N_{sc,ctrl}^{RB} \cdot N_{symb-UCI}^{PUCCH} \cdot Q_m.$$

In some implementations of the disclosure, the method 300 may further include the following. The network device determines $M_{RB}^{PUCCH}$ as the first number of PRBs on condition that $N_{RB}^{PUCCH}$ satisfies:

$$\left\lceil \frac{O_{UCI0} + O_{CRC0}}{r_0} \right\rceil + \left\lceil \frac{O_{UCI1} + O_{CRC1}}{r_1} \right\rceil >$$

-continued
$$\left(M_{RB}^{PUCCH} - 1\right) \cdot N_{sc,ctrl}^{RB} \cdot N_{symb-UCI}^{PUCCH} \cdot Q_m,$$

where $O_{UCI0}$ represents the total number of bits of the first UCI, $O_{CRC0}$ represents a number of CRC bits corresponding to the first UCI, $O_{CRC0}$ is greater than or equal to 0, $r_0$ represents the first maximum coding rate, $O_{UCI1}$ represents the total number of bits of the second UCI, $O_{CRC1}$ represents a number of CRC bits corresponding to the second UCI, $O_{CRC1}$ is greater than or equal to 0, $r_1$ represents the second maximum coding rate, $N_{sc,ctrl}^{RB}$ represents a parameter determined according to a PUCCH format used by the PUCCH resource and a number of subcarriers in a PRB in the PUCCH resource, or a parameter determined according to the PUCCH format used by the PUCCH resource, the number of subcarriers in the PRB in the PUCCH resource, and a code length of an orthogonal code used by the PUCCH format, $N_{symb-UCI}^{PUCCH}$ represents a number of symbols in the PUCCH resource determined according to the PUCCH format, $Q_m$ represents a modulation order, and $\lceil \; \rceil$ represents a rounding-up operation.

It can be understood that, for the operations of the method 300, reference can be made to the corresponding operations of the method 200, which will not be repeated herein for the sake of simplicity.

The above describes in detail the method implementations of the disclosure. The following will describe in detail apparatus implementations of the disclosure with reference to FIGS. 4 to 7.

Figure 4:
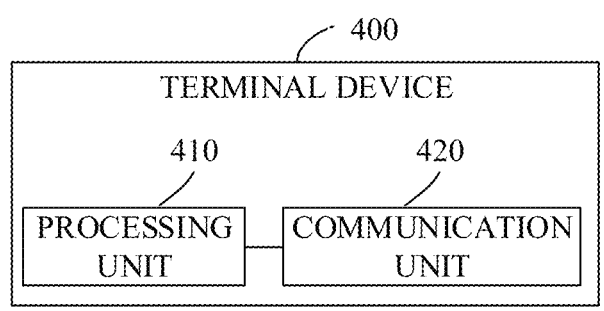
FIG. 4 is a schematic block diagram illustrating a terminal device provided in implementations of the disclosure.

FIG. 4 is a schematic block diagram illustrating a terminal device 400 provided in implementations of the disclosure.

As illustrated in FIG. 4, the terminal device 400 may include a processing unit 410 and a communication unit 420. The processing unit 410 is configured to: determine a PUCCH resource, where the PUCCH resource is used for transmitting first UCI and second UCI, and a priority of the first UCI is different from a priority of the second UCI; and determine a first number of PRBs according to a total number of bits of the first UCI, a total number of bits of the second UCI, a first maximum coding rate corresponding to the first UCI, and a second maximum coding rate corresponding to the second UCI, where the first number of PRBs is less than or equal to a number of PRBs $M_{RB}^{PUCCH}$ in the PUCCH resource. The communication unit 420 is configured to transmit target UCI according to the first number of PRBs, where the target UCI includes part or all of information in the first UCI and part or all of information in the second UCI.

In some implementations of the disclosure, the processing unit 410 is specifically configured to determine the first number of PRBs according to a first parameter and a second parameter, where a value of the first parameter is equal to a sum of the total number of bits of the first UCI and a number of CRC bits corresponding to the first UCI divided by the first maximum coding rate, and a value of the second parameter is equal to a sum of the total number of bits of the second UCI and a number of CRC bits corresponding to the second UCI divided by the second maximum coding rate.

In some implementations of the disclosure, the processing unit 410 is specifically configured to: determine a minimum number of PRBs $M_{RB,min}^{PUCCH}$ used for transmitting the first UCI and the second UCI in the PUCCH resource according to the total number of bits of the first UCI, the total number of bits of the second UCI, the first maximum coding rate, and the second maximum coding rate; and determine $M_{RB,min}^{PUCCH}$ as the first number of PRBs on condition that $M_{RB,min}^{PUCCH}$ is less than or equal to $M_{RB}^{PUCCH}$.

In some implementations of the disclosure, $M_{RB,min}^{PUCCH}$ satisfies:

$$\frac{O_{UCI0} + O_{CRC0}}{r_0} + \frac{O_{UCI1} + O_{CRC1}}{r_1} \leq M_{RB,min}^{PUCCH} \cdot N_{sc,ctrl}^{RB} \cdot N_{symb-UCI}^{PUCCH} \cdot Q_m,$$

where $O_{UCI0}$ represents the total number of bits of the first UCI, $O_{CRC0}$ represents a number of CRC bits corresponding to the first UCI, $O_{CRC0}$ is greater than or equal to 0, $r_0$ represents the first maximum coding rate, $O_{UCI1}$ represents the total number of bits of the second UCI, $O_{CRC1}$ represents a number of CRC bits corresponding to the second UCI, $O_{CRC1}$ is greater than or equal to 0, $r_1$ represents the second maximum coding rate, $N_{sc,ctrl}^{RB}$ represents a parameter determined according to a PUCCH format used by the PUCCH resource and a number of subcarriers in a PRB in the PUCCH resource, or a parameter determined according to the PUCCH format used by the PUCCH resource, the number of subcarriers in the PRB in the PUCCH resource, and a code length of an orthogonal code used by the PUCCH format, $N_{symb-UCI}^{PUCCH}$ represents a number of symbols in the PUCCH resource determined according to the PUCCH format, and $Q_m$ represents a modulation order.

In some implementations of the disclosure, $M_{RB}^{PUCCH} > 1$, and $M_{RB,min}^{PUCCH}$ further satisfies:

$$\frac{O_{UCI0} + O_{CRC0}}{r_0} + \frac{O_{UCI1} + O_{CRC1}}{r_1} > (M_{RB,min}^{PUCCH} - 1) \cdot N_{sc,ctrl}^{RB} \cdot N_{symb-UCI}^{PUCCH} \cdot Q_m.$$

In some implementations of the disclosure, $M_{RB}^{PUCCH}$ further satisfies:

$$\frac{O_{UCI0} + O_{CRC0}}{r_0} + \frac{O_{UCI1} + O_{CRC1}}{r_1} \leq M_{RB}^{PUCCH} \cdot N_{sc,ctrl}^{RB} \cdot N_{symb-UCI}^{PUCCH} \cdot Q_m.$$

In some implementations of the disclosure, the processing unit 410 is further configured to: determine $M_{RB}^{PUCCH}$ as the first number of PRBs on condition that $M_{RB}^{PUCCH}$ satisfies:

$$\frac{O_{UCI0} + O_{CRC0}}{r_0} + \frac{O_{UCI1} + O_{CRC1}}{r_1} > (M_{RB}^{PUCCH} - 1) \cdot N_{sc,ctrl}^{RB} \cdot N_{symb-UCI}^{PUCCH} \cdot Q_m,$$

where $O_{UCI0}$ represents the total number of bits of the first UCI, $O_{CRC0}$ represents a number of CRC bits corresponding to the first UCI, $O_{CRC0}$ is greater than or equal to 0, $r_0$ represents the first maximum coding rate, $O_{UCI1}$ represents the total number of bits of the second UCI, $O_{CRC1}$ represents a number of CRC bits corresponding to the second UCI, $O_{CRC1}$ is greater than or equal to 0, $r_1$ represents the second maximum coding rate, $N_{sc,ctrl}^{RB}$ represents a parameter determined according to a PUCCH format used by the PUCCH resource and a number of subcarriers in a PRB in the PUCCH resource, or a parameter determined according to the PUCCH format used by the PUCCH resource, the number of subcarriers in the PRB in the PUCCH resource, and a code length of an orthogonal code used by the PUCCH format, $N_{symb-UCI}^{PUCCH}$ represents a number of symbols in the PUCCH resource determined according to the PUCCH format, and $Q_m$ represents a modulation order.

In some implementations of the disclosure, $M_{RB,min}^{PUCCH}$ satisfies:

$$\left\lceil \frac{O_{UCI0} + O_{CRC0}}{r_0} \right\rceil + \left\lceil \frac{O_{UCI1} + O_{CRC1}}{r_1} \right\rceil \leq M_{RB,min}^{PUCCH} \cdot N_{sc,ctrl}^{RB} \cdot N_{symb-UCI}^{PUCCH} \cdot Q_m,$$

where $O_{UCI0}$ represents the total number of bits of the first UCI, $O_{CRC0}$ represents a number of CRC bits corresponding to the first UCI, $O_{CRC0}$ is greater than or equal to 0, $r_0$ represents the first maximum coding rate, $O_{UCI1}$ represents the total number of bits of the second UCI, $O_{CRC1}$ represents a number of CRC bits corresponding to the second UCI, $O_{CRC1}$ is greater than or equal to 0, $r_1$ represents the second maximum coding rate, $N_{sc,ctrl}^{RB}$ represents a parameter determined according to a PUCCH format used by the PUCCH resource and a number of subcarriers in a PRB in the PUCCH resource, or a parameter determined according to the PUCCH format used by the PUCCH resource, the number of subcarriers in the PRB in the PUCCH resource, and a code length of an orthogonal code used by the PUCCH format, $N_{symb-UCI}^{PUCCH}$ represents a number of symbols in the PUCCH resource determined according to the PUCCH format, $Q_m$ represents a modulation order, and $\lceil \ \rceil$ represents a rounding-up operation.

In some implementations of the disclosure, $M_{RB}^{PUCCH} > 1$, and $M_{RB,min}^{PUCCH}$ further satisfies:

$$\left\lceil \frac{O_{UCI0} + O_{CRC0}}{r_0} \right\rceil + \left\lceil \frac{O_{UCI1} + O_{CRC1}}{r_1} \right\rceil >$$
$$(M_{RB,min}^{PUCCH} - 1) \cdot N_{sc,ctrl}^{RB} \cdot N_{symb-UCI}^{PUCCH} \cdot Q_m.$$

In some implementations of the disclosure, $M_{RB}^{PUCCH}$ further satisfies:

$$\left\lceil \frac{O_{UCI0} + O_{CRC0}}{r_0} \right\rceil + \left\lceil \frac{O_{UCI1} + O_{CRC1}}{r_1} \right\rceil \leq M_{RB}^{PUCCH} \cdot N_{sc,ctrl}^{RB} \cdot N_{symb-UCI}^{PUCCH} \cdot Q_m.$$

In some implementations of the disclosure, the processing unit 410 is further configured to determine $M_{RB}^{PUCCH}$ as the first number of PRBs on condition that $M_{RB}^{PUCCH}$ satisfies:

$$\left\lceil \frac{O_{UCI0} + O_{CRC0}}{r_0} \right\rceil + \left\lceil \frac{O_{UCI1} + O_{CRC1}}{r_1} \right\rceil >$$
$$(M_{RB}^{PUCCH} - 1) \cdot N_{sc,ctrl}^{RB} \cdot N_{symb-UCI}^{PUCCH} \cdot Q_m,$$

where $O_{UCI0}$ represents the total number of bits of the first UCI, $O_{CRC0}$ represents a number of CRC bits corresponding to the first UCI, $O_{CRC0}$ is greater than or equal to 0, $r_0$ represents the first maximum coding rate, $O_{UCI1}$ represents the total number of bits of the second UCI, $O_{CRC1}$ represents a number of CRC bits corresponding to the second UCI, $O_{CRC1}$ is greater than or equal to 0, $r_1$ represents the second maximum coding rate, $N_{sc,ctrl}^{RB}$ represents a parameter determined according to a PUCCH format used by the PUCCH resource and a number of subcarriers in a PRB in the PUCCH resource, or a parameter determined according to the PUCCH format used by the PUCCH resource, the number of subcarriers in the PRB in the PUCCH resource, and a code length of an orthogonal code used by the PUCCH format, $N_{symb-UCI}^{PUCCH}$ represents a number of symbols in the PUCCH resource determined according to the PUCCH format, $Q_M$ represents a modulation order, and $\lceil\ \rceil$ represents a rounding-up operation.

Figure 5:
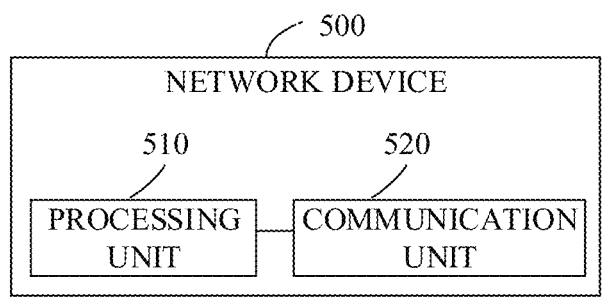
FIG. 5 is a schematic block diagram illustrating a network device provided in implementations of the disclosure.

FIG. 5 is a schematic block diagram illustrating a network device 500 provided in implementations of the disclosure.

As illustrated in FIG. 5, the network device 500 may include a processing unit 510 and a communication unit 520. The processing unit 510 is configured to: determine a PUCCH resource, where the PUCCH resource is used for transmitting first UCI and second UCI, and a priority of the first UCI is different from a priority of the second UCI; and determine a first number of PRBs according to a total number of bits of the first UCI, a total number of bits of the second UCI, a first maximum coding rate corresponding to the first UCI, and a second maximum coding rate corresponding to the second UCI, where the first number of PRBs is less than or equal to a number of PRBs $M_{RB}^{PUCCH}$ in the PUCCH resource. The communication unit 520 is configured to receive target UCI according to the first number of PRBs, where the target UCI includes part or all of information in the first UCI and part or all of information in the second UCI.

In some implementations of the disclosure, the processing unit 510 is specifically configured to determine the first number of PRBs according to a first parameter and a second parameter, where a value of the first parameter is equal to a sum of the total number of bits of the first UCI and a number of CRC bits corresponding to the first UCI divided by the first maximum coding rate, and a value of the second parameter is equal to a sum of the total number of bits of the second UCI and a number of CRC bits corresponding to the second UCI divided by the second maximum coding rate.

In some implementations of the disclosure, the processing unit 510 is specifically configured to: determine a minimum number of PRBs $M_{RB,min}^{PUCCH}$ used for transmitting the first UCI and the second UCI in the PUCCH resource according to the total number of bits of the first UCI, the total number of bits of the second UCI, the first maximum coding rate, and the second maximum coding rate; and determine $M_{RB,min}^{PUCCH}$ as the first number of PRBs on condition that $M_{RB,min}^{PUCCH}$ is less than or equal to $M_{RB}^{PUCCH}$.

In some implementations of the disclosure, $M_{RB,min}^{PUCCH}$ satisfies:

$$\frac{O_{UCI0}+O_{CRC0}}{r_0}+\frac{O_{UCI1}+O_{CRC1}}{r_1} \le M_{RB,min}^{PUCCH}\cdot N_{sc,ctrl}^{RB}\cdot N_{symb-UCI}^{PUCCH}\cdot Q_m,$$

where $O_{UCI0}$ represents the total number of bits of the first UCI, $O_{CRC0}$ represents a number of CRC bits corresponding to the first UCI, $O_{CRC0}$ is greater than or equal to 0, $r_0$ represents the first maximum coding rate, $O_{UCI1}$ represents the total number of bits of the second UCI, $O_{CRC1}$ represents a number of CRC bits corresponding to the second UCI, $O_{CRC1}$ is greater than or equal to 0, $r_1$ represents the second maximum coding rate, $N_{sc,ctrl}^{RB}$ represents a parameter determined according to a PUCCH format used by the PUCCH resource and a number of subcarriers in a PRB in the PUCCH resource, or a parameter determined according to the PUCCH format used by the PUCCH resource, the number of subcarriers in the PRB in the PUCCH resource, and a code length of an orthogonal code used by the PUCCH format, $N_{symb-UCI}^{PUCCH}$ represents a number of symbols in the PUCCH resource determined according to the PUCCH format, and $Q_m$ represents a modulation order.

In some implementations of the disclosure, $M_{RB}^{PUCCH}>1$, and $M_{RB,min}^{PUCCH}$ further satisfies:

$$\frac{O_{UCI0}+O_{CRC0}}{r_0}+\frac{O_{UCI1}+O_{CRC1}}{r_1} > (M_{RB,min}^{PUCCH}-1)\cdot N_{sc,ctrl}^{RB}\cdot N_{symb-UCI}^{PUCCH}\cdot Q_m.$$

In some implementations of the disclosure, $M_{RB}^{PUCCH}$ further satisfies:

$$\frac{O_{UCI0}+O_{CRC0}}{r_0}+\frac{O_{UCI1}+O_{CRC1}}{r_1} \le M_{RB}^{PUCCH}\cdot N_{sc,ctrl}^{RB}\cdot N_{symb-UCI}^{PUCCH}\cdot Q_m.$$

In some implementations of the disclosure, the processing unit 510 is further configured to determine $M_{RB}^{PUCCH}$ as the first number of PRBs on condition that $M_{RB}^{PUCCH}$ satisfies:

$$\frac{O_{UCI0}+O_{CRC0}}{r_0}+\frac{O_{UCI1}+O_{CRC1}}{r_1} > (M_{RB}^{PUCCH}-1)\cdot N_{sc,ctrl}^{RB}\cdot N_{symb-UCI}^{PUCCH}\cdot Q_m,$$

where $O_{UCI0}$ represents the total number of bits of the first UCI, $O_{CRC0}$ represents a number of CRC bits corresponding to the first UCI, $O_{CRC0}$ is greater than or equal to 0, $r_0$ represents the first maximum coding rate, $O_{UCI1}$ represents the total number of bits of the second UCI, $O_{CRC1}$ represents a number of CRC bits corresponding to the second UCI, $O_{CRC1}$ is greater than or equal to 0, $r_1$ represents the second maximum coding rate, $N_{sc,ctrl}^{RB}$ represents a parameter determined according to a PUCCH format used by the PUCCH resource and a number of subcarriers in a PRB in the PUCCH resource, or a parameter determined according to the PUCCH format used by the PUCCH resource, the number of subcarriers in the PRB in the PUCCH resource, and a code length of an orthogonal code used by the PUCCH format, $N_{symb-UCI}^{PUCCH}$ represents a number of symbols in the PUCCH resource determined according to the PUCCH format, and $Q_m$ represents a modulation order.

In some implementations of the disclosure, $M_{RB,min}^{PUCCH}$ satisfies:

$$\left\lceil\frac{O_{UCI0}+O_{CRC0}}{r_0}\right\rceil+\left\lceil\frac{O_{UCI1}+O_{CRC1}}{r_1}\right\rceil \le M_{RB,min}^{PUCCH}\cdot N_{sc,ctrl}^{RB}\cdot N_{symb-UCI}^{PUCCH}\cdot Q_m,$$

where $O_{UCI0}$ represents the total number of bits of the first UCI, $O_{CRC0}$ represents a number of CRC bits corresponding to the first UCI, $O_{CRC0}$ is greater than or equal to 0, $r_0$ represents the first maximum coding rate, $O_{UCI1}$ represents the total number of bits of the second UCI, $O_{CRC1}$ represents a number of CRC bits corresponding to the second UCI, $O_{CRC1}$ is greater than or equal to 0, $r_1$ represents the second maximum coding rate, $N_{sc,ctrl}^{RB}$ represents a parameter determined according to a PUCCH format used by the PUCCH resource and a number of subcarriers in a PRB in the PUCCH resource, or a parameter determined according to the PUCCH format used by the PUCCH resource, the number of subcarriers in the PRB in the PUCCH resource, and a code length of an orthogonal code used by the PUCCH format, $N_{symb-UCI}^{PUCCH}$ represents a number of symbols in the PUCCH resource determined according to the PUCCH format, $Q_m$ represents a modulation order, and $\lceil\ \rceil$ represents a rounding-up operation.

In some implementations of the disclosure, $M_{RB}^{PUCCH} > 1$, and $M_{RB,min}^{PUCCH}$ further satisfies:

$$\left\lceil \frac{O_{UCI0} + O_{CRC0}}{r_0} \right\rceil + \left\lceil \frac{O_{UCI1} + O_{CRC1}}{r_1} \right\rceil >$$
$$(M_{RB,min}^{PUCCH} - 1) \cdot N_{sc,ctrl}^{RB} \cdot N_{symb-UCI}^{PUCCH} \cdot Q_m.$$

In some implementations of the disclosure, $M_{RB}^{PUCCH}$ further satisfies:

$$\left\lceil \frac{O_{UCI0} + O_{CRC0}}{r_0} \right\rceil + \left\lceil \frac{O_{UCI1} + O_{CRC1}}{r_1} \right\rceil \leq M_{RB}^{PUCCH} \cdot N_{sc,ctrl}^{RB} \cdot N_{symb-UCI}^{PUCCH} \cdot Q_m.$$

In some implementations of the disclosure, the processing unit 510 is further configured to determine $M_{RB}^{PUCCH}$ as the first number of PRBs on condition that $M_{RB}^{PUCCH}$ satisfies:

$$\left\lceil \frac{O_{UCI0} + O_{CRC0}}{r_0} \right\rceil + \left\lceil \frac{O_{UCI1} + O_{CRC1}}{r_1} \right\rceil >$$
$$(M_{RB}^{PUCCH} - 1) \cdot N_{sc,ctrl}^{RB} \cdot N_{symb-UCI}^{PUCCH} \cdot Q_m,$$

where $O_{UCI0}$ represents the total number of bits of the first UCI, $O_{CRC0}$ represents a number of CRC bits corresponding to the first UCI, $O_{CRC0}$ is greater than or equal to 0, $r_0$ represents the first maximum coding rate, $O_{UCI1}$ represents the total number of bits of the second UCI, $O_{CRC1}$ represents a number of CRC bits corresponding to the second UCI, $O_{CRC1}$ is greater than or equal to 0, $r_1$ represents the second maximum coding rate, $N_{sc,ctrl}^{RB}$ represents a parameter determined according to a PUCCH format used by the PUCCH resource and a number of subcarriers in a PRB in the PUCCH resource, or a parameter determined according to the PUCCH format used by the PUCCH resource, the number of subcarriers in the PRB in the PUCCH resource, and a code length of an orthogonal code used by the PUCCH format, $N_{symb-UCI}^{PUCCH}$ represents a number of symbols in the PUCCH resource determined according to the PUCCH format, $Q_m$ represents a modulation order, and $\lceil \ \rceil$ represents a rounding-up operation.

It can be understood that, device/apparatus implementations and method implementations may correspond to each other, and reference can be made to the method implementations. Specifically, the terminal device 400 illustrated in FIG. 4 may correspond to a corresponding body that performs the method 200 in implementations of the disclosure, and the foregoing and other operations and/or functions of each unit of the terminal device 400 are respectively for implementing corresponding processes of each method in FIG. 2. Similarly, the network device 500 illustrated in FIG. 5 may correspond to a corresponding body that performs the method 300 in implementations of the disclosure, and the foregoing and other operations and/or functions of each unit of the network device 500 are respectively for implementing corresponding processes of each method in FIG. 3, which will not be repeated herein for the sake of simplicity.

The communication devices in implementations of the disclosure are described with reference to the accompanying drawings from the viewpoint of a functional module. It can be understood that, the functional module can be implemented in the form of hardware, software, or a combination of hardware and software modules.

Specifically, each operation of the method implementations in implementations of the disclosure can be completed an integrated logic circuit in the form of hardware or an instruction in the form of software in the processor. The operations of the methods disclosed in implementations of the disclosure may be implemented through a hardware decoding processor, or a combination of hardware and a software module in the decoding processor.

Optionally, the software module can be located in a storage medium such as a random access memory (RAM), a flash memory, a read-only memory (ROM), a programmable ROM (PROM), or an electrically erasable programmable memory, a register, and the like. The storage medium is located in a memory. The processor reads information in the memory, and completes the operations of the method implementations described above with the hardware thereof.

For example, the processing unit and the communication unit mentioned above can be respectively implemented as a processor and a transceiver.

Figure 6:
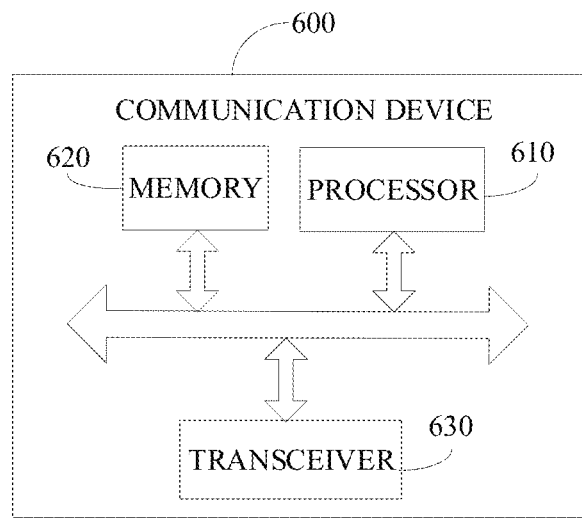
FIG. 6 is a schematic block diagram illustrating a communication device provided in implementations of the disclosure.

FIG. 6 is a schematic block diagram illustrating a communication device 600 provided in implementations of the disclosure.

As illustrated in FIG. 6, the communication device 600 may include a processor 610.

The processor 610 is configured to invoke and execute computer programs stored in a memory to perform the method in implementations of the disclosure.

Referring to FIG. 6 again, the communication device 600 may further include a memory 620.

The memory 620 is configured to store indication information, or codes or instructions executed by the processor 610. The processor 610 is configured to invoke and execute computer programs stored in the memory 620 to perform the method in implementations of the disclosure. The memory 620 may be a separate device independent of the processor 610, or may be integrated in the processor 610.

Referring to FIG. 6 again, the communication device 600 may further include a transceiver 630.

The processor 610 can control the transceiver 630 to communicate with other devices, for example, to transmit information or data to other devices, or receive information or data from other devices. The transceiver 630 may include a transmitter and a receiver. The transceiver 630 may further include one or more antennas.

It can be understood that, various components of the communication device 600 are coupled together via a bus system. In addition to a data bus, the bus system further includes a power bus, a control bus, and a status signal bus.

It can also be understood that, the communication device 600 may be the terminal device in implementations of the disclosure, and can implement the corresponding process implemented by the terminal device in various methods according to implementations of the disclosure. That is, the communication device 600 in implementations of the disclosure may correspond to the terminal device 400 in implementations of the disclosure and may correspond to a corresponding body that performs the method in in implementations of the disclosure. The processor 610 and the transceiver 630 may respectively implement the operations and/or functions implemented by the processing unit 410 and the communication unit 420 of the terminal device 400, which will not be repeated herein for the sake of simplicity. Similarly, the communication device 600 may be the network device in implementations of the disclosure, and can implement the corresponding process implemented by the network device in various methods according to implementations of the disclosure. That is, the communication device 600 in implementations of the disclosure may correspond to the network device 500 in implementations of the disclosure and may correspond to a corresponding body that performs the method in in implementations of the disclosure. The processor 610 and the transceiver 630 may respectively implement the operations and/or functions implemented by the processing unit 510 and the communication unit 520 of the network device 500, which will not be repeated herein for the sake of simplicity.

In addition, a chip is further provided in implementations of the disclosure.

For example, the chip may be an integrated circuit chip with signal processing capabilities and is configured to implement or perform each method, operation, and logic block diagram disclosed in implementations of the disclosure. The chip may also be referred to as a system-level chip, a system chip, a chip system, a system-on-a-chip chip, or the like. Optionally, the chip can be applied to various communication devices, to cause a communication device installed with the chip to perform each method, operation, and logic block diagram disclosed in implementations of the disclosure.

Figure 7:
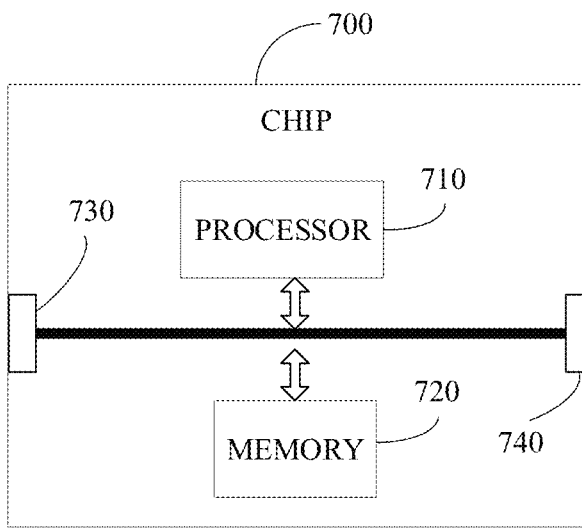
FIG. 7 is a schematic block diagram illustrating a chip provided in implementations of the disclosure.

FIG. 7 is a schematic block diagram illustrating a chip 700 provided in implementations of the disclosure.

As illustrated in FIG. 7, the chip 700 may include a processor 710.

The processor 710 is configured to invoke and execute computer programs stored in a memory to perform the method in implementations of the disclosure.

Referring to FIG. 7 again, the chip 700 may further include a memory 720.

The processor 710 is configured to invoke and execute computer programs stored in the memory 720 to perform the method in implementations of the disclosure. The memory 720 is configured to store indication information, or codes or instructions executed by the processor 710. The memory 720 may be a separate device independent of the processor 710, or may be integrated in the processor 710.

Referring to FIG. 7 again, the chip 700 may further include an input interface 730.

The processor 710 can control the input interface 730 to communicate with other devices or chips, for example, to obtain information or data transmitted by other devices or chips.

Referring to FIG. 7 again, the chip 700 may further include an output interface 740.

The processor 710 can control the output interface 740 to communicate with other devices or chips, for example, to output information or data to other devices or chips.

It can be understood that, the chip 700 can be applied to the network device in implementations of the disclosure, and can implement the corresponding process implemented by the network device or the corresponding process implemented by the terminal device in various methods according to implementations of the disclosure, which will not be repeated herein for the sake of simplicity.

It can be understood that, various components of the chip 700 are coupled together via a bus system. In addition to a data bus, the bus system further includes a power bus, a control bus, and a status signal bus.

The processor mentioned above may include, but is not limited to a general-purpose processor, a digital signal processor (DSP), an application specific integrated circuit (ASIC), a field programmable gate array (FPGA), or other programmable logic devices, discrete gates or transistor logic devices, discrete hardware components, etc.

The processor may be configured to implement or perform each method, operation, and logic block diagram disclosed in implementations of the disclosure. The operations of the methods disclosed in implementations of the disclosure may be implemented through a hardware decoding processor, or a combination of hardware and software modules in the decoding processor. The software module can be located in a storage medium such as an RAM, a flash memory, an ROM, a PROM, or an erasable programmable memory, a register, and the like. The storage medium is located in a memory. The processor reads information in the memory, and completes the operations of the method implementations described above with the hardware thereof.

The memory mentioned above includes, but is not limited to a volatile and/or non-volatile memory. The non-volatile memory may be an ROM, a PROM, an erasable PROM (EPROM), an electrically EPROM (EEPROM), or a flash memory. The volatile memory may be an RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), and a direct rambus RAM (DR RAM).

The memory described herein is intended to include, but is not limited to, these and any other suitable types of memory.

A computer-readable storage medium is further provided in implementations of the disclosure. The computer-readable storage medium is configured to store computer programs. The computer-readable storage medium is configured to store one or more computer programs including instructions which, when executed by a portable electronic device with multiple applications, cause the portable electronic device to perform the method in the method implementations.

Optionally, the computer-readable storage medium can be applied to the terminal device in implementations of the disclosure, and the computer programs are operable with a computer to perform the corresponding process implemented by the terminal device in various methods according to implementations of the disclosure, which will not be repeated herein for the sake of simplicity. Optionally, the computer-readable storage medium can be applied to the network device in implementations of the disclosure, and the computer programs are operable with a computer to perform the corresponding process implemented by the network device in various methods according to implementations of the disclosure, which will not be repeated herein for the sake of simplicity.

A computer program product is further provided in implementations of the disclosure. The computer program product includes computer program instructions.

Optionally, the computer program product can be applied to the terminal device in implementations of the disclosure and the computer programs are operable with a computer to perform the corresponding process implemented by the terminal device in various methods according to implementations of the disclosure, which will not be repeated herein for the sake of simplicity. Optionally, the computer program product can be applied to the network device in implementations of the disclosure and the computer programs are operable with a computer to perform the corresponding process implemented by the network device in various methods according to implementations of the disclosure, which will not be repeated herein for the sake of simplicity.

A computer program is further provided in implementations of the disclosure. The computer program, when running on a computer, is operable with the computer to perform the method in the method implementations.

Optionally, the computer program can be applied to the terminal device in implementations of the disclosure, and is operable with the computer to perform the corresponding process implemented by the terminal device in various methods according to implementations of the disclosure when the computer program runs on the computer, which will not be repeated herein for the sake of simplicity. Optionally, the computer program can be applied to the network device in implementations of the disclosure, and is operable with the computer to perform the corresponding process implemented by the network device in various methods according to implementations of the disclosure when the computer program runs on the computer, which will not be repeated herein for the sake of simplicity.

In addition, a communication system is further provided in implementations of the disclosure. The communication system may include the terminal device and the network device mentioned above, to form the communication system as illustrated in FIG. 1, which will not be repeated herein for the sake of simplicity. It should be noted that, the term "system" herein may also be referred to as "network management architecture", "network system", etc.

It can also be understood that, the terms used in the implementations and the claims of the disclosure are merely for describing specific implementations rather than limiting implementations of the disclosure. For example, the terms "a", "the", "said", and the like in a singular form used in the implementations and the claims of the disclosure are intended to include plural forms as well, unless the context clearly indicates otherwise.

Those skilled in the art should recognize that, in combination with the example units and scheme steps described in the implementations disclosed herein, the disclosure can be implemented in electronic hardware or a combination of computer software and the electronic hardware. Whether these functions are implemented by way of the hardware or software depends on the particular application and design constraints of the technical solutions. Those skilled in the art may use different methods to implement the described functions for each particular application, but such implementation should not be considered as beyond the scope of the disclosure.

The integrated unit may be stored in a computer-readable storage medium when it is implemented in the form of a software functional unit and is sold or used as a separate product. Based on such understanding, the technical solutions of the disclosure essentially, or part of the technical solutions that contributes to the related art, or all or part of the technical solutions, may be embodied in the form of a software product which is stored in a storage medium and includes instructions for causing a computer device (which may be a personal computer, a server, or a network device and so on) to perform all or part of the steps described in the various implementations of the disclosure. The storage medium includes various medium capable of storing program codes, such as a universal serial bus (USB) flash disk, a removable hard disk, an ROM, an RAM, a disk, compact disc (CD), or the like.

It will be evident to those skilled in the art that, for the sake of convenience and simplicity, for the specific working processes of the foregoing systems, apparatuses, and units, reference can be made to the corresponding processes in the foregoing method implementations, which will not be repeated herein.

In several embodiments provided in the disclosure, it will be appreciated that the system, apparatuses, and the methods disclosed may also be implemented in other manners. For example, the division of units, modules, or assemblies in the above apparatus implementations is merely a division of logical functions, and there may exist other manners of division in practice, e.g., multiple units, modules, or assemblies may be combined or may be integrated into another system, or some units, modules, or assemblies may be ignored or skipped. For another example, units/modules/assemblies illustrated as separate/display components may or may not be physically separate, i.e., may reside at one location or may be distributed to multiple network units. Some or all of the units/modules/assemblies may be selectively adopted according to practical needs to achieve desired objectives of the disclosure.

The above are merely specific implementations of the disclosure and are not intended to limit the protection scope of the disclosure. Any modification and replacement made by those skilled in the art within the technical scope of the disclosure shall be included in the protection scope of the disclosure. Therefore, the protection scope of the disclosure should be stated in the protection scope of the claims.

What is claimed is:

1. A method for wireless communication, comprising:

determining, by a terminal device, a physical uplink control channel (PUCCH) resource, the PUCCH resource being used for transmitting first uplink control information (UCI) and second UCI, and a priority of the first UCI being different from a priority of the second UCI;

determining, by the terminal device, a first number of physical resource blocks (PRB) according to a total number of bits of the first UCI, a total number of bits of the second UCI, a first maximum coding rate corresponding to the first UCI, and a second maximum coding rate corresponding to the second UCI, the first number of PRBs being less than or equal to a number of PRBs $M_{RB}^{PUCCH}$ in the PUCCH resource; and transmitting, by the terminal device, target UCI according to the first number of PRBs, the target UCI comprising part or all of information in the first UCI and part or all of information in the second UCI;

wherein determining, by the terminal device, the first number of PRBs according to the total number of bits of the first UCI, the total number of bits of the second UCI, the first maximum coding rate corresponding to the first UCI, and the second maximum coding rate corresponding to the second UCI comprises:

determining, by the terminal device, a minimum number of PRBs $M_{RB,min}^{PUCCH}$ used for transmitting the first UCI and the second UCI in the PUCCH resource according to the total number of bits of the first UCI, the total number of bits of the second UCI, the first maximum coding rate, and the second maximum coding rate; and determining, by the terminal device, $M_{RB,min}^{PUCCH}$ as the first number of PRBs on condition that $M_{RB,min}^{PUCCH}$ is less than or equal to $M_{RB}^{PUCCH}$.

2. The method of claim 1, wherein $M_{RB,min}^{PUCCH}$ satisfies:

$$\frac{O_{UCI0} + O_{CRC0}}{r_0} + \frac{O_{UCI1} + O_{CRC1}}{r_1} \leq M_{RB,min}^{PUCCH} \cdot N_{sc,ctrl}^{RB} \cdot N_{symb-UCI}^{PUCCH} \cdot Q_m,$$

wherein $O_{UCI0}$ represents the total number of bits of the first UCI, $O_{CRC0}$ represents a number of CRC bits corresponding to the first UCI, $O_{CRC0}$ is greater than or equal to 0, $r_0$ represents the first maximum coding rate, $O_{CRC0}$ represents the total number of bits of the second UCI, $O_{CRC1}$ represents a number of CRC bits corresponding to the second UCI, $O_{CRC1}$ is greater than or equal to 0, $r_1$ represents the second maximum coding rate, $N_{sc,ctrl}^{RB}$ represents a parameter determined according to a PUCCH format used by the PUCCH resource and a number of subcarriers in a PRB in the PUCCH resource, or a parameter determined according to the PUCCH format used by the PUCCH resource, the number of subcarriers in the PRB in the PUCCH resource, and a code length of an orthogonal code used by the PUCCH format, $N_{symb-UCI}^{PUCCH}$ represents a number of symbols in the symbols in the PUCCH resource determined according to the PUCCH format, and $Q_m$ represents a modulation order.

3. The method of claim 2, wherein $M_{RB}^{PUCCH} > 1$, and $M_{RB,min}^{PUCCH}$ further satisfies:

$$\frac{O_{UCI0} + O_{CRC0}}{r_0} + \frac{O_{UCI1} + O_{CRC1}}{r_1} > (M_{RB,min}^{PUCCH} - 1) \cdot N_{sc,ctrl}^{RB} \cdot N_{symb-UCI}^{PUCCH} \cdot Q_m.$$

4. The method of claim 2, wherein $M_{RB}^{PUCCH}$ further satisfies:

$$\frac{O_{UCI0} + O_{CRC0}}{r_0} + \frac{O_{UCI1} + O_{CRC1}}{r_1} \leq M_{RB}^{PUCCH} \cdot N_{sc,ctrl}^{RB} \cdot N_{symb-UCI}^{PUCCH} \cdot Q_m.$$

5. The method of claim 1, further comprising:
determining, by the terminal device, $M_{RB}^{PUCCH}$ as the first number of PRBs on condition that $M_{RB}^{PUCCH}$ satisfies:

$$\frac{O_{UCI0} + O_{CRC0}}{r_0} + \frac{O_{UCI1} + O_{CRC1}}{r_1} > (M_{RB}^{PUCCH} - 1) \cdot N_{sc,ctrl}^{RB} \cdot N_{symb-UCI}^{PUCCH} \cdot Q_m,$$

wherein $O_{UCI0}$ represents the total number of bits of the first UCI, $O_{CRC0}$ represents a number of CRC bits corresponding to the first UCI, $O_{CRC0}$ is greater than or equal to 0, $r_0$ represents the first maximum coding rate, $O_{UCI1}$ represents the total number of bits of the second UCI, $O_{CRC1}$ represents a number of CRC bits corresponding to the second UCI, $O_{CRC1}$ is greater than or equal to 0, $r_1$ represents the second maximum coding rate, $N_{sc,ctrl}^{RB}$ represents a parameter determined according to a PUCCH format used by the PUCCH resource and a number of subcarriers in a PRB in the PUCCH resource, or a parameter determined according to the PUCCH format used by the PUCCH resource, the number of subcarriers in the PRB in the PUCCH resource, and a code length of an orthogonal code used by the PUCCH format, $N_{symb-UCI}^{PUCCH}$ represents a number of symbols in the PUCCH resource determined according to the PUCCH format, and $Q^m$ represents a modulation order.

6. The method of claim 1, wherein $M_{RB,min}^{PUCCH}$ satisfies:

$$\left\lceil \frac{O_{UCI0} + O_{CRC0}}{r_0} \right\rceil + \left\lceil \frac{O_{UCI1} + O_{CRC1}}{r_1} \right\rceil \leq M_{RB,min}^{PUCCH} \cdot N_{sc,ctrl}^{RB} \cdot N_{symb-UCI}^{PUCCH} \cdot Q_m,$$

wherein $O_{UCI0}$ represents the total number of bits of the first UCI, $O_{CRC0}$ represents a number of CRC bits corresponding to the first UCI, $O_{CRC0}$ is greater than or equal to 0, $r_0$ represents the first maximum coding rate, $O_{UCI1}$ represents the total number of bits of the second UCI, $O_{CRC1}$ represents a number of CRC bits corresponding to the second UCI, $O_{CRC1}$ is greater than or equal to 0, $r_1$ represents the second maximum coding rate, $N_{sc,ctrl}^{RB}$ represents a parameter determined according to a PUCCH format used by the PUCCH resource and a number of subcarriers in a PRB in the PUCCH resource, or a parameter determined according to the PUCCH format used by the PUCCH resource, the number of subcarriers in the PRB in the PUCCH resource, and a code length of an orthogonal code used by the PUCCH format, $N_{symb-UCI}^{PUCCH}$ represents a number of symbols in the PUCCH resource determined according to the PUCCH format, $Q_m$ represents a modulation order, and represents a rounding-up operation.

7. The method of claim 6, wherein $M_{RB}^{PUCCH} > 1$, and $M_{RB,min}^{PUCCH}$ further satisfies:

$$\left\lceil \frac{O_{UCI0} + O_{CRC0}}{r_0} \right\rceil + \left\lceil \frac{O_{UCI1} + O_{CRC1}}{r_1} \right\rceil >$$
$$(M_{RB,min}^{PUCCH} - 1) \cdot N_{sc,ctrl}^{RB} \cdot N_{symb-UCI}^{PUCCH} \cdot Q_m.$$

8. The method of claim 6, wherein $M_{RB}^{PUCCH}$ further satisfies:

$$\left\lceil \frac{O_{UCI0} + O_{CRC0}}{r_0} \right\rceil + \left\lceil \frac{O_{UCI1} + O_{CRC1}}{r_1} \right\rceil \leq M_{RB}^{PUCCH} \cdot N_{sc,ctrl}^{RB} \cdot N_{symb-UCI}^{PUCCH} \cdot Q_m.$$

9. The method of claim 1, further comprising:
determining, by the terminal device, $M_{RB}^{PUCCH}$ as the first number of PRBs on condition that $M_{RB}^{PUCCH}$ satisfies:

$$\left\lceil \frac{O_{UCI0} + O_{CRC0}}{r_0} \right\rceil + \left\lceil \frac{O_{UCI1} + O_{CRC1}}{r_1} \right\rceil >$$
$$(M_{RB}^{PUCCH} - 1) \cdot N_{sc,ctrl}^{RB} \cdot N_{symb-UCI}^{PUCCH} \cdot Q_m,$$

wherein $O_{UCI0}$ represents the total number of bits of the first UCI, $O_{CRC0}$ represents a number of CRC bits corresponding to the first UCI, $O_{CRC0}$ is greater than or equal to 0, $r_0$ represents the first maximum coding rate, $O_{UCI1}$ represents the total number of bits of the second UCI, $O_{CRC1}$ represents a number of CRC bits corresponding to the second UCI, $O_{CRC1}$ is greater than or equal to 0, $r_1$ represents the second maximum coding rate, $N_{sc,ctrl}^{RB}$ represents a parameter determined according to a PUCCH format used by the PUCCH resource and a number of subcarriers in a PRB in the PUCCH resource, or a parameter determined according to the PUCCH format used by the PUCCH resource, the number of subcarriers in the PRB in the PUCCH resource, and a code length of an orthogonal code used by the PUCCH format, $N_{symb-UCI}^{PUCCH}$ represents a number of symbols in the PUCCH resource determined according to the PUCCH format, $Q_m$ represents a modulation order, and ⌈ ⌉ represents a rounding-up operation.

10. A terminal device, comprising:
   a transceiver;
   a memory configured to store computer programs; and
   a processor configured to invoke and execute the computer programs stored in the memory to:
      determine a physical uplink control channel (PUCCH) resource, the PUCCH resource being used for transmitting first uplink control information (UCI) and second UCI, and a priority of the first UCI being different from a priority of the second UCI;
      determine a first number of physical resource blocks (PRB) according to a total number of bits of the first UCI, a total number of bits of the second UCI, a first maximum coding rate corresponding to the first UCI, and a second maximum coding rate corresponding to the second UCI, the first number of PRBs being less than or equal to a number of PRBs $M_{RB}^{PUCCH}$ in the PUCCH resource; and
      cause the transceiver to transmit target UCI according to the first number of PRBs, the target UCI comprising part or all of information in the first UCI and part or all of information in the second UCI;
   wherein the processor is specifically configured to:
      determine a minimum number of PRBs $M_{RB,min}^{PUCCH}$ used for transmitting the first UCI and the second UCI in the PUCCH resource according to the total number of bits of the first UCI, the total number of bits of the second UCI, the first maximum coding rate, and the second maximum coding rate; and
      determine $M_{RB,min}^{PUCCH}$ as the first number of PRBs on condition that $M_{RB,min}^{PUCCH}$ is less than or equal to $M_{RB}^{PUCCH}$.

11. The terminal device of claim 10, wherein $M_{RB,min}^{PUCCH}$ satisfies:

$$\frac{O_{UCI0} + O_{CRC0}}{r_0} + \frac{O_{UCI1} + O_{CRC1}}{r_1} \leq M_{RB,min}^{PUCCH} \cdot N_{sc,ctrl}^{RB} \cdot N_{symb-UCI}^{PUCCH} \cdot Q_m,$$

wherein $O_{UCI0}$ represents the total number of bits of the first UCI, $O_{CRC0}$ represents a number of CRC bits corresponding to the first UCI, $O_{CRC0}$ is greater than or equal to 0, $r_0$ represents the first maximum coding rate, $O_{UCI1}$ represents the total number of bits of the second UCI, $O_{CRC1}$ represents a number of CRC bits corresponding to the second UCI, $O_{CRC1}$ is greater than or equal to 0, $r_1$ represents the second maximum coding rate, $N_{sc,ctrl}^{RB}$ represents a parameter determined according to a PUCCH format used by the PUCCH resource and a number of subcarriers in a PRB in the PUCCH resource, or a parameter determined according to the PUCCH format used by the PUCCH resource, the number of subcarriers in the PRB in the PUCCH resource, and a code length of an orthogonal code used by the PUCCH format, $N_{symb-UCI}^{PUCCH}$ represents a number of symbols in the PUCCH resource determined according to the PUCCH format, and $Q_m$ represents a modulation order.

12. The terminal device of claim 11, wherein $M_{RB}^{PUCCH} > 1$, and $M_{RB,min}^{PUCCH}$ further satisfies:

$$\frac{O_{UCI0} + O_{CRC0}}{r_0} + \frac{O_{UCI1} + O_{CRC1}}{r_1} > (M_{RB,min}^{PUCCH} - 1) \cdot N_{sc,ctrl}^{RB} \cdot N_{symb-UCI}^{PUCCH} \cdot Q_m.$$

13. A network device, comprising:
   a transceiver;
   a memory configured to store computer programs; and
   a processor configured to invoke and execute the computer programs stored in the memory to:
      determine a physical uplink control channel (PUCCH) resource, the PUCCH resource being used for transmitting first uplink control information (UCI) and second UCI, and a priority of the first UCI being different from a priority of the second UCI;
      determine a first number of physical resource blocks (PRB) according to a total number of bits of the first UCI, a total number of bits of the second UCI, a first maximum coding rate corresponding to the first UCI, and a second maximum coding rate corresponding to the second UCI, the first number of PRBs being less than or equal to a number of PRBs $M_{RB}^{PUCCH}$ in the PUCCH resource; and
      cause the transceiver to receive target UCI according to the first number of PRBs, the target UCI comprising part or all of information in the first UCI and part or all of information in the second UCI;
   wherein the processor is specifically configured to:
      determine a minimum number of PRBs $M_{RB,min}^{PUCCH}$ used for transmitting the first UCI and the second UCI in the PUCCH resource according to the total number of bits of the first UCI, the total number of bits of the second UCI, the first maximum coding rate, and the second maximum coding rate; and
      determine $M_{RB,min}^{PUCCH}$ as the first number of PRBs on condition that $M_{RB,min}^{PUCCH}$ is less than or equal to $M_{RB}^{PUCCH}$.

14. The network device of claim 13, wherein $M_{RB,min}^{PUCCH}$ satisfies:

$$\frac{O_{UCI0} + O_{CRC0}}{r_0} + \frac{O_{UCI1} + O_{CRC1}}{r_1} \leq M_{RB,min}^{PUCCH} \cdot N_{sc,ctrl}^{RB} \cdot N_{symb-UCI}^{PUCCH} \cdot Q_m,$$

wherein $O_{UCI0}$ represents the total number of bits of the first UCI, $O_{CRC0}$ represents a number of CRC bits corresponding to the first UCI, $O_{CRC0}$ is greater than or equal to 0, $r_0$ represents the first maximum coding rate, $O_{UCI1}$ represents the total number of bits of the second UCI, $O_{CRC1}$ represents a number of CRC bits corresponding to the second UCI, $O_{CRC1}$ is greater than or equal to 0, $r_1$ represents the second maximum coding rate, $N_{sc,ctrl}^{RB}$ represents a parameter determined according to a PUCCH format used by the PUCCH resource and a number of subcarriers in a PRB in the PUCCH resource, or a parameter determined according to the PUCCH format used by the PUCCH resource, the number of subcarriers in the PRB in the PUCCH resource, and a code length of an orthogonal code used by the PUCCH format, $N_{symb-UCI}^{PUCCH}$ represents a number of symbols in the PUCCH resource determined according to the PUCCH format, and $Q_m$ represents a modulation order.

* * * * *

UNITED STATES PATENT AND TRADEMARK OFFICE
CERTIFICATE OF CORRECTION

Page 1 of 1

PATENT NO. : 12,414,111 B2
APPLICATION NO. : 18/342565
DATED : September 9, 2025
INVENTOR(S) : Yanan Lin and Jing Xu et al.

It is certified that error appears in the above-identified patent and that said Letters Patent is hereby corrected as shown below:

In the Claims

Column 28 at Line 25 in Claim 6 "modulation order, and represents a rounding up operation." should read: --modulation order, and ⌈ ⌉ represents a rounding up operation--.

Signed and Sealed this
Twenty-first Day of October, 2025

John A. Squires
*Director of the United States Patent and Trademark Office*